(12) United States Patent
Kwak et al.

(10) Patent No.: US 12,335,868 B2
(45) Date of Patent: Jun. 17, 2025

(54) SIGNALING TO WAKE UP A CELL

(71) Applicant: QUALCOMM Incorporated, San Diego, CA (US)

(72) Inventors: Yongjun Kwak, San Diego, CA (US); Hung Dinh Ly, San Diego, CA (US); Ahmed Attia Abotabl, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 495 days.

(21) Appl. No.: 17/555,150

(22) Filed: Dec. 17, 2021

(65) Prior Publication Data
US 2023/0199649 A1 Jun. 22, 2023

(51) Int. Cl.
*H04W 52/02* (2009.01)
*H04W 56/00* (2009.01)
*H04W 74/0833* (2024.01)

(52) U.S. Cl.
CPC ..... *H04W 52/0229* (2013.01); *H04W 56/001* (2013.01); *H04W 74/0833* (2013.01)

(58) Field of Classification Search
CPC ........... H04W 52/0229; H04W 56/001; H04W 74/0833; H04W 52/0216; H04W 52/0258; Y02D 30/70
USPC ......................................................... 370/329
See application file for complete search history.

(56) References Cited

U.S. PATENT DOCUMENTS

| 2014/0302856 | A1* | 10/2014 | Nory ...................... H04W 68/02 |
| | | | 455/437 |
| 2019/0246410 | A1* | 8/2019 | Zhang ............... H04W 72/0446 |
| 2020/0029358 | A1* | 1/2020 | Akkarakaran ........ H04L 5/0053 |
| 2021/0195603 | A1* | 6/2021 | Jiang ..................... H04W 72/30 |
| 2022/0182951 | A1* | 6/2022 | Zhou ..................... H04W 24/10 |

(Continued)

FOREIGN PATENT DOCUMENTS

WO WO-2018136060 A1 * 7/2018 ........ H04W 52/0206

OTHER PUBLICATIONS

Oikonomakou et al. "A power consumption model and energy saving techniques for 5G-Advanced base stations" IEEE ICC 2023 GreenNet (Year: 2023).*

(Continued)

*Primary Examiner* — Basil Ma
(74) *Attorney, Agent, or Firm* — Holland & Hart LLP

(57) ABSTRACT

Methods, systems, and devices for wireless communications are described. Base stations may reduce energy consumption by minimizing the use of periodic signals such as the system information block one (SIB1), which a user equipment (UE) may use to perform a random access channel (RACH) procedure with a base station. A UE may transmit a wake-up signal to the base station requesting an SIB1. The base station may transmit a synchronization signal block (SSB) that indicates that the base station is not transmitting an SIB1, and the UE may transmit the cell wake-up signal in response. A base station may refrain from periodically transmitting SSBs. A UE may determine that it is within range of a base station and that it has not received an SSB. The UE may transmit a wake-up signal to the base station, and the base station may transmit an SSB and an SIB1 to the UE.

30 Claims, 19 Drawing Sheets

(56) References Cited

U.S. PATENT DOCUMENTS

2022/0190902 A1* 6/2022 Zhang ................. H04W 56/001
2023/0043789 A1* 2/2023 Maleki ................. H04W 76/28

OTHER PUBLICATIONS

Huawei., et al., "Unified On-Demand Initial Access Signals Transmission for Connected and Idle UE Mobility," 3GPP TSG RAN WG1 Meeting #87, R1-1611668, 3rd Generation Partnership Project, Mobile Competence Centre 650, Route Des Lucioles, F-06921 Sophia-Antipolis Cedex, France, vol. RAN WG1, Reno, USA, Nov. 14, 2016-Nov. 18, 2016, Nov. 13, 2016, XP051175640, 6 pages.
International Search Report and Written Opinion—PCT/US2022/081092—ISA/EPO—Apr. 6, 2023.
LG Electronics: "Further Discussions on Small Cell On/Off", 3GPP TSG RAN WG1 Meeting #75, R1-135473, 3rd Generation Partnership Project, Mobile Competence Centre, 650, Route Des Lucioles, F-06921 Sophia-Antipolis Cedex, France, vol. RAN WG1, No. San Francisco, USA, Nov. 11, 2013-Nov. 15, 2013, Nov. 13, 2013, XP050735146, pp. 1-5.

* cited by examiner

SIGNALING TO WAKE UP A CELL

FIELD OF TECHNOLOGY

The following relates to wireless communications, including a signaling to wake up a cell.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE)

SUMMARY

The described techniques relate to improved methods, systems, devices, and apparatuses that support signaling to wake up a cell. Some base stations may reduce or limit transmissions of signals such as the system information block (SIB) one (SIB1). SIB1 resources may be indicated by a synchronization signal block (SSB). A user equipment (UE) may use information transmitted within SIB1 to perform a random access channel (RACH) procedure with a base station to connect with the base station. A UE may transmit a cell wake-up signal to the base station requesting that the base station transmit an SIB1. In some examples, the base station may transmit an SSB that indicates that the base station is not periodically transmitting an SIB1, and the UE may transmit the wake-up signal in response to receiving the SSB. In some examples, the SSB may include an indication of resources for transmitting the wake-up signal (e.g., in the physical broadcast channel (PBCH)). In some examples, the base station may transmit an SSB using a first PBCH configuration that includes the indication of resources for transmitting the wake-up signal. After the UE transmits the wake-up signal the base station may transmit a second SSB including a PBCH having a second configuration indicating a control resource set (CORESET) for communications between the UE and the base station. The CORESET may indicate to the UE a timing for monitoring for an SIB1 from the base station.

In some examples, the base station may also transmit SSBs on-demand (e.g., the base station may refrain from periodically transmitting SSBs). A UE may determine that the UE is within range of a base station (e.g., based on global positioning system (GPS), other location information, or information from a sync source such as a coverage cell) and determine that the UE has not received an SSB from the base station. The UE may transmit a wake-up signal to the base station, and in response the base station may transmit an SSB and an SIB1 to the UE which may be used to establish communications between the UE and the base station.

A method for wireless communications at a user equipment (UE) is described. The method may include identifying a cell wake-up signal resource for transmission of a cell wake-up signal, transmitting, to a base station, a cell wake-up signal over the cell wake-up signal resource, and receiving, from the base station and in response to the cell wake-up signal, an SIB that is indicative of a random access transmission resource.

An apparatus for wireless communications at a UE is described. The apparatus may include a processor, memory coupled with the processor, and instructions stored in the memory. The instructions may be executable by the processor to cause the apparatus to identify a cell wake-up signal resource for transmission of a cell wake-up signal, transmit, to a base station, a cell wake-up signal over the cell wake-up signal resource, and receive, from the base station and in response to the cell wake-up signal, an SIB that is indicative of a random access transmission resource.

Another apparatus for wireless communications at a UE is described. The apparatus may include means for identifying a cell wake-up signal resource for transmission of a cell wake-up signal, means for transmitting, to a base station, a cell wake-up signal over the cell wake-up signal resource, and means for receiving, from the base station and in response to the cell wake-up signal, an SIB that is indicative of a random access transmission resource.

A non-transitory computer-readable medium storing code for wireless communications at a UE is described. The code may include instructions executable by a processor to identify a cell wake-up signal resource for transmission of a cell wake-up signal, transmit, to a base station, a cell wake-up signal over the cell wake-up signal resource, and receive, from the base station and in response to the cell wake-up signal, an SIB that is indicative of a random access transmission resource.

Some examples of the method, apparatuses, and non-transitory computer-readable medium described herein may further include operations, features, means, or instructions for receiving, from the base station, an SSB, where the SSB includes an indication that the base station is not currently transmitting the SIB.

In some examples of the method, apparatuses, and non-transitory computer-readable medium described herein, transmitting the cell wake-up signal is based on the indication that the base station is not currently transmitting the SIB.

In some examples of the method, apparatuses, and non-transitory computer-readable medium described herein, the indication that the base station may be not currently transmitting the SIB may include at least one of a PBCH, a primary synchronization signal, or a secondary synchronization signal.

Some examples of the method, apparatuses, and non-transitory computer-readable medium described herein may further include operations, features, means, or instructions for receiving, with the SSB, a PBCH indicating a resource configuration for the cell wake-up signal resource.

In some examples of the method, apparatuses, and non-transitory computer-readable medium described herein, the cell wake-up signal resource may be associated with the SSB on a per SSB basis.

In some examples of the method, apparatuses, and non-transitory computer-readable medium described herein, transmitting the cell wake-up signal may include operations, features, means, or instructions for transmitting the cell wake-up signal via a physical random access channel sequence.

In some examples of the method, apparatuses, and non-transitory computer-readable medium described herein, receiving the SIB may include operations, features, means, or instructions for receiving the SIB over at least one reception occasion of a set of multiple reception occasions or during a duration of time.

In some examples of the method, apparatuses, and non-transitory computer-readable medium described herein, receiving the SIB may include operations, features, means, or instructions for receiving the SIB over a single reception occasion.

Some examples of the method, apparatuses, and non-transitory computer-readable medium described herein may further include operations, features, means, or instructions for receiving, from the base station, a first SSB including a first PBCH indicative of the cell wake-up signal resource, where identifying the cell wake-up signal resource may be based on receiving the first PBCH and receiving, from the base station and in response to transmission of the cell wake-up signal, a second SSB associated with the SIB and including a second PBCH indicative of a control resource set configuration.

Some examples of the method, apparatuses, and non-transitory computer-readable medium described herein may further include operations, features, means, or instructions for identifying that the UE may have not received an SSB from the base station, where transmitting the cell wake-up signal may be based on the identifying that the UE may have not received the SSB from the base station.

Some examples of the method, apparatuses, and non-transitory computer-readable medium described herein may further include operations, features, means, or instructions for receiving positioning information for the UE and identifying the base station based on the positioning information.

In some examples of the method, apparatuses, and non-transitory computer-readable medium described herein, the SIB includes an SIB one.

Some examples of the method, apparatuses, and non-transitory computer-readable medium described herein may further include operations, features, means, or instructions for transmitting, to the base station, a random access channel message over the random access transmission resource.

A method for wireless communications at a base station is described. The method may include receiving, from a UE, a cell wake-up signal over a cell wake-up signal resource and transmitting, to the UE and in response to the cell wake-up signal, an SIB that is indicative of a random access transmission resource for communications between the UE and the base station.

An apparatus for wireless communications at a base station is described. The apparatus may include a processor, memory coupled with the processor, and instructions stored in the memory. The instructions may be executable by the processor to cause the apparatus to receive, from a UE, a cell wake-up signal over a cell wake-up signal resource and transmit, to the UE and in response to the cell wake-up signal, an SIB that is indicative of a random access transmission resource for communications between the UE and the base station.

Another apparatus for wireless communications at a base station is described. The apparatus may include means for receiving, from a UE, a cell wake-up signal over a cell wake-up signal resource and means for transmitting, to the UE and in response to the cell wake-up signal, an SIB that is indicative of a random access transmission resource for communications between the UE and the base station.

A non-transitory computer-readable medium storing code for wireless communications at a base station is described. The code may include instructions executable by a processor to receive, from a UE, a cell wake-up signal over a cell wake-up signal resource and transmit, to the UE and in response to the cell wake-up signal, an SIB that is indicative of a random access transmission resource for communications between the UE and the base station.

In some examples of the method, apparatuses, and non-transitory computer-readable medium described herein, receiving the cell wake-up signal is based on the indication that the base station is not currently transmitting the SIB.

Some examples of the method, apparatuses, and non-transitory computer-readable medium described herein may further include operations, features, means, or instructions for transmitting, with the SSB, an indication that the base station may be not currently transmitting the SIB.

In some examples of the method, apparatuses, and non-transitory computer-readable medium described herein, transmitting the indication that the base station may be not currently transmitting the SIB may include operations, features, means, or instructions for transmitting the indication that the base station may be not currently transmitting the SIB via at least one of a PBCH, a primary synchronization signal, or a secondary synchronization signal.

Some examples of the method, apparatuses, and non-transitory computer-readable medium described herein may further include operations, features, means, or instructions for transmitting, with the SSB, a PBCH indicating a resource configuration for the cell wake-up signal resource.

In some examples of the method, apparatuses, and non-transitory computer-readable medium described herein, the cell wake-up signal resource may be associated with the SSB on a per SSB basis.

In some examples of the method, apparatuses, and non-transitory computer-readable medium described herein, receiving the cell wake-up signal may include operations, features, means, or instructions for receiving the cell wake-up signal via a physical random access channel sequence.

In some examples of the method, apparatuses, and non-transitory computer-readable medium described herein, transmitting the SIB may include operations, features, means, or instructions for transmitting the SIB over at least one reception occasion of a set of multiple reception occasions or during a duration of time.

In some examples of the method, apparatuses, and non-transitory computer-readable medium described herein, transmitting the SIB may include operations, features, means, or instructions for transmitting the SIB over a single reception occasion.

Some examples of the method, apparatuses, and non-transitory computer-readable medium described herein may further include operations, features, means, or instructions for transmitting, to the UE, a first SSB including a first PBCH indicative of the cell wake-up signal resource, where identifying the cell wake-up signal resource may be based on receiving the first PBCH and transmitting, to the UE and in response to reception of the cell wake-up signal, a second SSB associated with the SIB and including a second PBCH indicative of a control resource set configuration.

In some examples of the method, apparatuses, and non-transitory computer-readable medium described herein, the SIB includes an SIB one.

Some examples of the method, apparatuses, and non-transitory computer-readable medium described herein may further include operations, features, means, or instructions for receiving, from the UE, a random access channel message over the random access transmission resource, in accordance with the SIB.

DETAILED DESCRIPTION

In some wireless communications systems, base stations may reduce energy consumption by minimizing the use of always-on or periodic signals. For example, some base stations may reduce or limit transmissions of signals such as the system information block (SIB) one (SIB1). SIB1 resources may be indicated by a physical broadcast channel (PBCH) within a synchronization signal block (SSB). A user equipment (UE) may use information transmitted within SIB1 to perform a random access channel (RACH) procedure with a base station to connect with the base station. If the UE does not receive an SIB1 from a base station, the UE may be unable to perform a RACH procedure with the base station.

A UE may transmit a cell wake-up signal to the base station requesting that the base station transmit an SIB1. In some examples, the base station may transmit an SSB that indicates that the base station is not periodically transmitting an SIB1, and the UE may transmit the cell wake-up signal in response to receiving the SSB. In some examples, the SSB may include an indication of resources for transmitting the cell wake-up signal (e.g., in the PBCH). In some examples, the base station may transmit an SSB using a first PBCH configuration that includes the indication of resources for transmitting the cell wake-up signal. After the UE transmits the cell wake-up signal the base station may transmit a second SSB including a PBCH having a second configuration indicating a control resource set (CORESET) for communications between the UE and the base station. The CORESET may indicate to the UE a timing for monitoring for an SIB1 from the base station.

In some examples, the base station may also transmit SSBs on-demand (e.g., the base station may refrain from periodically transmitting SSBs). A UE may determine that the UE is within range of a base station (e.g., based on global positioning system (GPS), other location information, or information from a sync source such as a coverage cell) and determine that the UE has not received an SSB from the base station. The UE may transmit a cell wake-up signal to the base station, and in response the base station may transmit an SSB and an SIB1 to the UE which may be used to establish communications between the UE and the base station.

Aspects of the disclosure are initially described in the context of wireless communications systems. Aspects of the disclosure are further illustrated by and described with reference to timing diagrams and process flows. Aspects of the disclosure are further illustrated by and described with reference to apparatus diagrams, system diagrams, and flowcharts that relate to signaling to wake up a cell.

Figure 1:
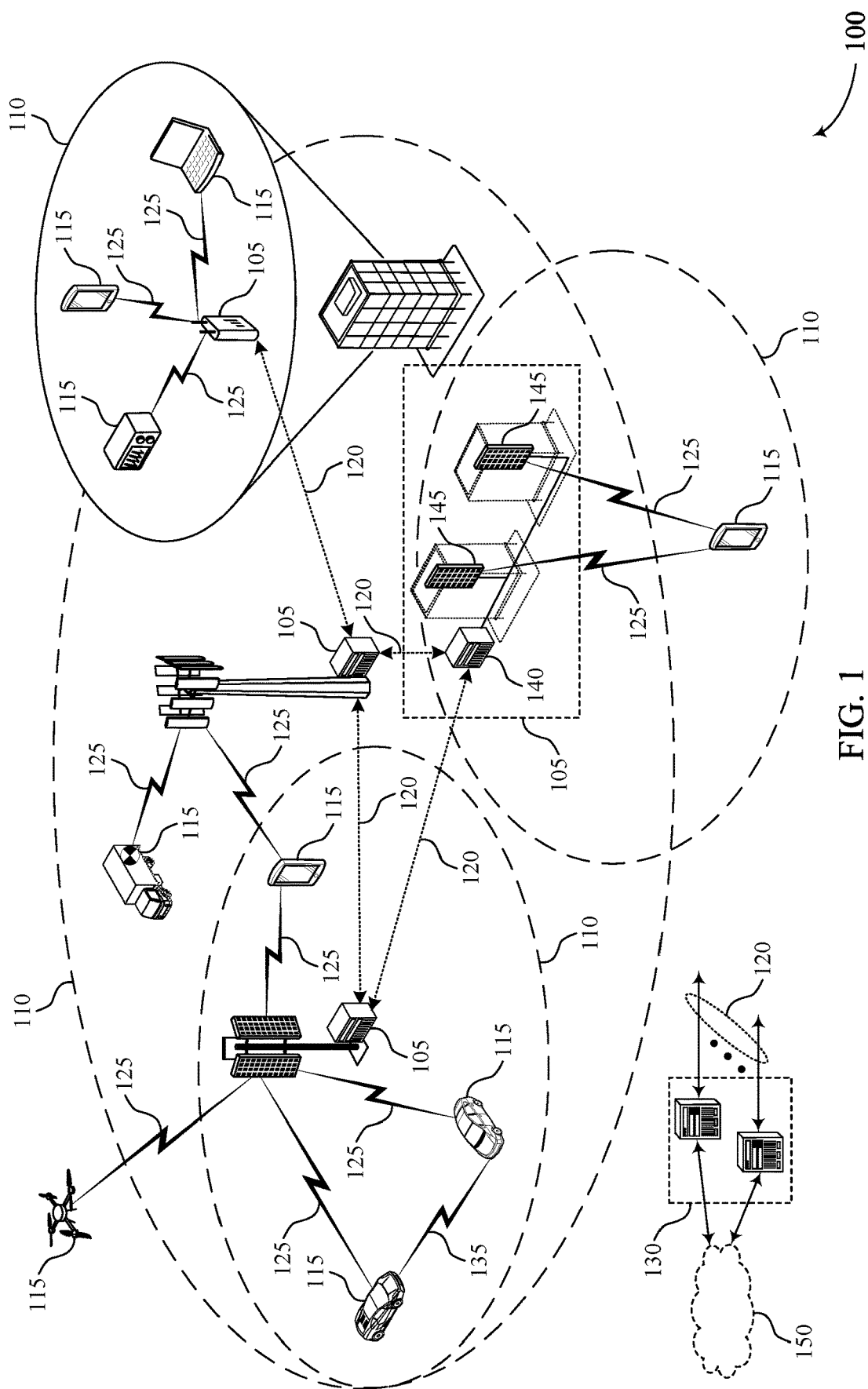
FIG. 1 illustrates an example of a wireless communications system that supports signaling to wake up a cell in accordance with aspects of the present disclosure.

FIG. 1 illustrates an example of a wireless communications system 100 that supports signaling to wake up a cell in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some base stations 105 may reduce energy consumption by minimizing the use of always-on or periodic signals. For example, some base stations 105 may reduce or limit transmissions of signals such as SIB1. SIB1 resources may be indicated by a PBCH within an SSB. A UE 115 may use information transmitted within SIB1 to perform a RACH procedure with a base station 105 to connect with the base station 105. If the UE 115 does not receive an SIB1 from a base station 105, the UE 115 may be unable to perform a RACH procedure with the base station 105.

A UE 115 may transmit a cell wake-up signal to the base station 105 requesting that the base station 105 transmit an SIB1. In some examples, the base station 105 may transmit an SSB that indicates that the base station 105 is not currently transmitting an SIB1, and the UE 115 may transmit the cell wake-up signal in response to receiving the SSB. In some examples, the SSB may include an indication of resources for transmitting the cell wake-up signal (e.g., in the PBCH). In some examples, the base station 105 may transmit an SSB using a first PBCH configuration that includes the indication of resources for transmitting the cell wake-up signal. After the UE 115 transmits the cell wake-up signal the base station 105 may transmit a second SSB including a PBCH having a second configuration indicating a CORESET for communications between the UE 115 and the base station 105. The CORESET may indicate to the UE 115 a timing for monitoring for an SIB1 from the base station 105.

In some examples, the base station 105 may also transmit SSBs on-demand (e.g., the base station 105 may refrain from periodically transmitting SSBs). A UE 115 may determine that the UE 115 is within range of a base station 105 (e.g., based on GPS, other location information, or information from a sync source such as a coverage cell) and determine that the UE 115 has not received an SSB from the base station 105. The UE 115 may transmit a cell wake-up signal to the base station 105, and in response the base station 105 may transmit an SSB and an SIB1 to the UE 115 which may be used to establish communications between the UE 115 and the base station 105.

Figure 2:
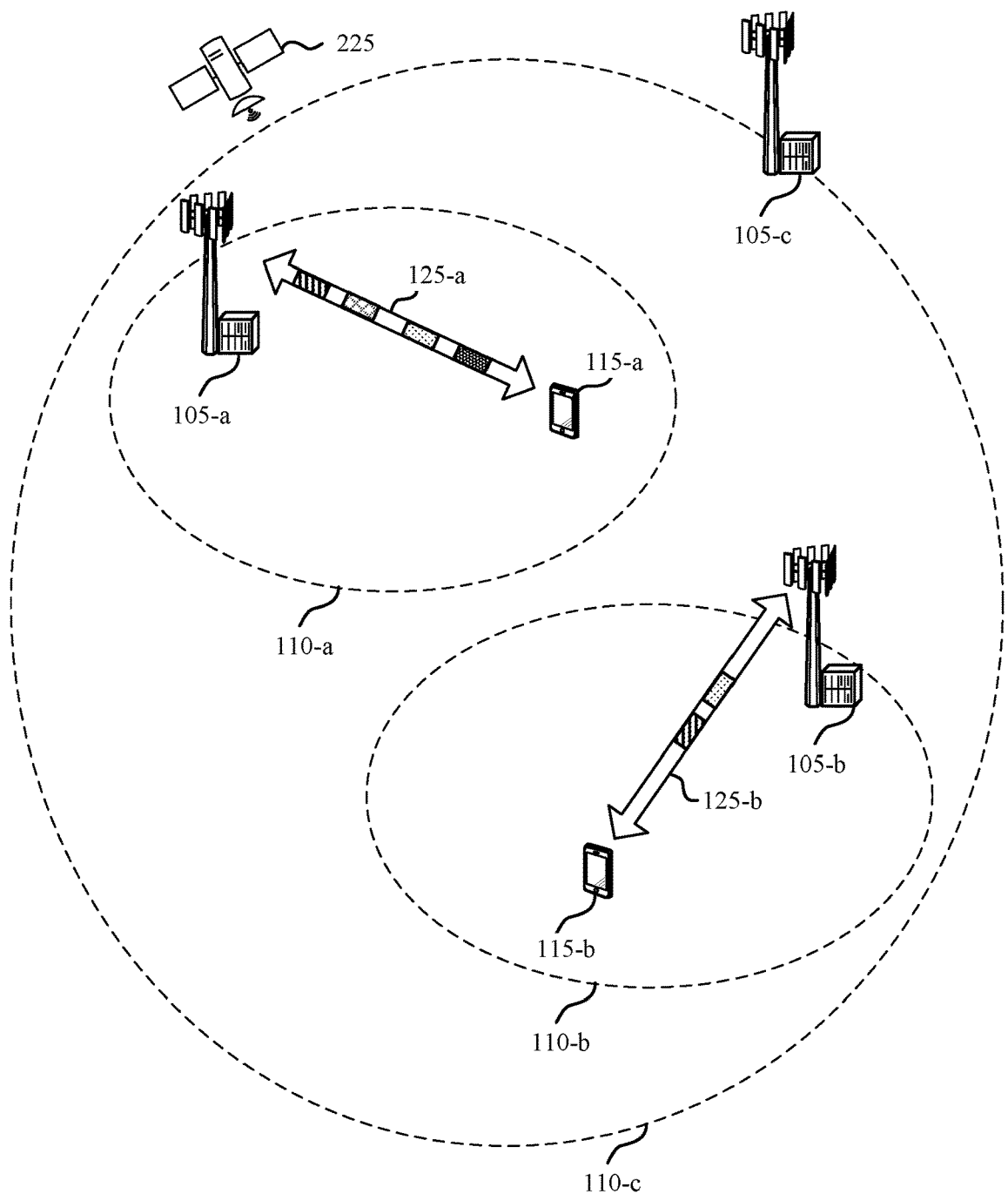
FIG. 2 illustrates an example of a wireless communications system that supports signaling to wake up a cell in accordance with aspects of the present disclosure.

FIG. 2 illustrates an example of a wireless communications system 200 that supports signaling to wake up a cell in accordance with aspects of the present disclosure. In some examples, the wireless communications system 200 may implement aspects of wireless communications system 100. The wireless communications system 200 may include UEs 115-a and 115-b, which may be examples of UEs 115 as described herein. The wireless communications system 200 may include base stations 105-a, 105-b, and 105-c, which may be examples of base stations 105 as described herein.

The UE 115-a may be within a geographic coverage area 110-a of the base station 105-a, and the UE 115-b may be within the geographic coverage area of the base station 105-b. The geographic coverage areas 110-a and 110-b may both be within the geographic coverage area 110-c of a coverage cell base station 105-c. The base station 105-b may communicate with the UE 115-b using a communication channel 125-b. The base station 105-b may periodically transmit SSBs 205 and SIBs 215 (e.g., an SIB1), which may convey information that the UE 115-b may use to establish communications with the base station 105-b via the communication channel 125-b (e.g., via a RACH procedure). For example, the base station 105-b may not operate in a reduced energy consumption mode and may periodically transmit an SIB1 215. In some examples, the base station 105-b may be a macro cell.

The base station 105-a may reduce or limit transmission of periodic signals such as SSB 205 or SIB1 215 to reduce energy consumption. The UE 115-a within the geographic coverage area 110-a of the base station 105-a may transmit a cell wake-up signal 210 via the communication channel 125-a requesting that the base station 105-a transmit an SIB1 215.

In some examples, the cell wake-up signal 210 may be transmitted using one single sequence using single frequency network transmissions. In some examples, multiple UEs 115 within the geographic coverage area 110-a may transmit cell wake-up signals 210 to the base station 105-a concurrently. The base station 105-a may receive a non-coherent combined cell wake-up signal from the multiple UEs 115. In some examples, multiple UEs 115 may use multiple sequences to transmit cell wake-up signals 210 to differentiate the UEs 115. For example, the UE 115-a may transmit the cell wake-up signal 210 along with identifying information.

The UE 115-a may use the information conveyed within the within SIB1 215 to perform a RACH procedure 220 (e.g., to transmit a msg1). In some examples, the base station 105-a may transmit an SSB 205 that indicates that the base station 105-a is not currently transmitting an SIB1 215, and the UE 115-a may transmit the cell wake-up signal 210 in response to receiving the SSB 205. In some examples, the SSB 205 may include an indication of resources for transmitting the cell wake-up signal (e.g., in the PBCH). In some examples, the base station 105-a may transmit an SSB 205 using a first PBCH configuration that includes the indication of resources for transmitting the cell wake-up signal 210. After the UE 115-a transmits the cell wake-up signal 210, the base station 105-a may transmit a second SSB 205 including a PBCH having a second configuration indicating a CORESET for communications between the UE 115-a and the base station 105-a. The CORESET may indicate to the UE 115-a a timing for monitoring for an SIB1 215 from the base station 105-a.

The cell wake-up signal 210 may be transmitted using an uplink resource (e.g., a small uplink resource) and may use a large periodicity. In some examples, the cell wake-up signal 210 may use the same periodicity as the SSB 205. In some examples, resources for transmitting cell wake-up signals 210 may be defined per SSB 205 (e.g., per beam). In some examples, the resources for the cell wake-up signal 210 may be shared with the physical RACH (PRACH) resources. For example, from the base station 105-a perspective, one PRACH sequence may be reserved for receiving a cell wake-up signal 210. In some examples, the PBCH indicating the resources for transmitting the cell wake-up signal 210 may include the PRACH occasion configuration for transmitting the cell wake-up signal 210 (e.g., the cell wake-up signal resources and the uplink power control parameter).

In some examples, the base station 105-a may also transmit SSBs 205 on-demand (e.g., the base station 105-a may refrain from periodically transmitting SSBs 205). For example, the base station 105-a may operate in a standalone or a non-standalone mode. The UE 115-a may determine that the UE 115-a is within the geographic coverage area 110-a of the base station 105-a. For example, the UE 115-a may receive and determine location information from one or more GPS satellites 225, or the UE 115-a may receive and determine location information from another source (e.g., via a mobility procedure). In some examples, the UE 115-a may be notified that the UE 115-a is within the geographic coverage area via an indication transmitted from the coverage cell base station 105-c. The UE 115-a may determine that the UE 115-a has not received an SSB 205 from the base station 105-a. The UE 115-a may transmit a cell wake-up signal 210 to the base station 105-a, and in response the base station 105-a may transmit an SSB 205 and an SIB1 215 to the UE 115-a, which the UE 115-a may use to establish communications between the UE 115-a and the base station 105-a. In some examples, the UE 115-a may receive an indication of timing information for transmitting the cell wake-up signal 210 to the base station 105-a from a synchronization source such as the coverage cell base station 105-c or a GPS satellite 225.

In some examples, where the base station 105-a may transmit SSBs 205 on-demand, the resources for transmitting the cell wake-up signal 210 may be pre-configured. For example, the UE 115-a may have received an indication of the resources for transmitting the cell wake-up signal 210 when the UE 115-a was previously in a connected state with the base station 105-a or with another base station 105. In some examples, the UE 115-a may receive an indication of the resources for transmitting the cell wake-up signal 210 from the coverage cell base station 105-c. In some examples, the resources for transmitting cell wake-up signals 210 to base stations 105 may be pre-configured or standardized (e.g., synchronized for all base stations within a geographic area). In some examples, the resources for transmitting the cell wake-up signal 210 may be fixed based on an absolute timing (e.g., base stations 105 may monitor for cell wake-up signals 210 according to a fixed timing), and the UE 115-a may receive an indication of the timing from a synchronization source such as the coverage cell base station 105-c or a GPS satellite 225. The UE 115-a may determine the frequency resources for transmitting the cell wake-up signal 210 based on a frequency band search. For example, different cell wake-up signals 210 may be configured at different frequency bands. The UE 115-a may perform a frequency band search based on a look-up table associated with a location of the UE 115-a or particular network operators.

In some examples, multiple base stations 105 may receive a cell wake-up signal 210 transmitted by the UE 115-a. The multiple base stations 105 may wake-up and transmit SSBs 205 in response to receiving the cell wake-up signal 210. In some examples, if the UE 115-*a* receives multiple SSBs 205 (e.g., from multiple base stations 105) after transmitting the cell wake-up signal 210, the UE 115-*a* may perform measurements on the received SSBs 205 to determine which beam and/or base station 105 to connect with. In some examples, if a UE 115-*a* is in an idle mode and does not detect an SSB 205 (e.g., to transition out of the idle mode to a connected state), the UE 115-*a* may transmit a cell wake-up signal 210 in order to receive and read an SSB 205 (and an included PBCH).

Figure 3:
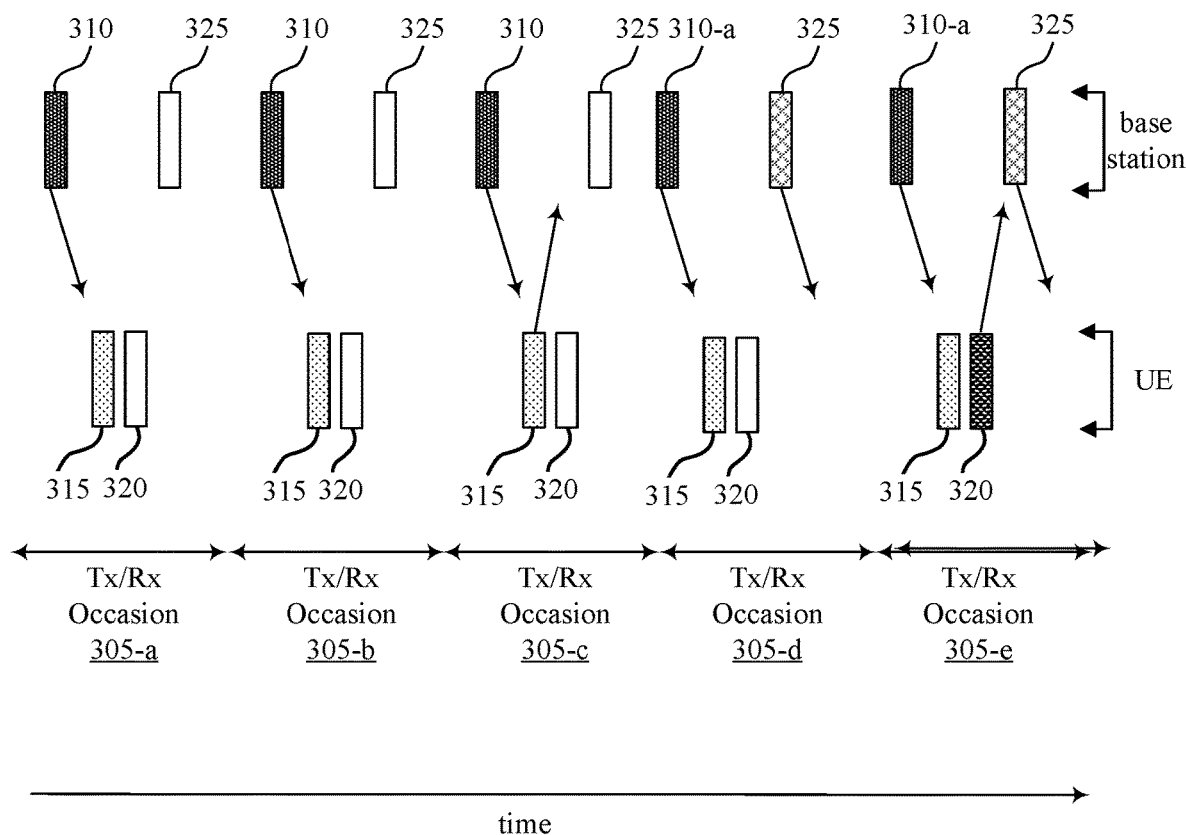
FIG. 3 illustrates an example of a timing diagram that supports signaling to wake up a cell in accordance with aspects of the present disclosure.

FIG. 3 illustrates an example of a timing diagram 300 that supports signaling to wake up a cell in accordance with aspects of the present disclosure. In some examples, the timing diagram 300 may be implemented by or may implement aspects of the wireless communications system 100 or 200.

During a first transmission and reception occasion 305-*a* and a second transmission and reception occasion 305-*b*, a base station 105 may transmit an SSB 310 that indicates that the base station 105 is not currently transmitting an SIB1 325. Accordingly, the UE 115 may not be able to determine and configure a RACH occasion 320. The SSB 310 may include a primary synchronization signal (PSS), a secondary synchronization signal (SSS), and a PBCH. In some examples, an indication field in the PBCH may indicate that the base station 105 is not currently transmitting an SIB1 325. In some examples one type of demodulation reference signal (DMRS) sequence within the PBCH may indicate that the that the base station 105 is not currently transmitting an SIB1 325, while a second type of DMRS sequence may indicate that the base station 105 is currently transmitting an SIB1 325. In some examples, different types of sequences of PSS or SSS may be used to indicate whether the base station 105 is currently transmitting an SIB1 325. The PBCH within the SSB 310 may indicate the resources for transmitting a cell wake-up signal 315 to the base station 105. The base station 105 may also monitor for a cell wake-up signal 315 in the resources indicated for the cell wake-up signal 315.

During the third transmission and reception occasion 305-*c*, the UE 115 may transmit the cell wake-up signal 315 to the base station 105, which the base station may monitor for and receive, using the resources indicated in the PBCH received in the second transmission and reception occasion 305-*b*.

In response, during the fourth transmission and reception occasion 305-*d*, the base station 105 may transmit an SSB 310-*a* indicating that the base station 105 is currently transmitting an SIB1 325. For example, the SSB 310-*a* may indicate that that the base station 105 is currently transmitting SIB1 325 via an indication field in PBCH, a DMRS sequence type, or a PSS or SSS sequence type. The base station 105 may also transmit the SIB1 325. In some examples, the UE 115 may monitor for the SIB1 325 based on the indication in the SSB 310-*a* that the base station 105 is currently transmitting the SIB1 325. In some examples, SIB1 325 may be transmitted in a single transmission occasion. In some examples, the SIB1 325 may be transmitted over multiple transmission occasions.

The UE 115 may determine the resources for a RACH occasion 320 based on the information within the SIB1 325. In the fifth transmission and reception occasion 305-*e*, the UE 115 may transmit a RACH message (e.g., a msg1) during the RACH occasion 320. The base station 105 may monitor for and receive the RACH message during the RACH occasion 320. The base station 105 and the UE 115 may complete a RACH procedure and establish communications.

Figure 4:
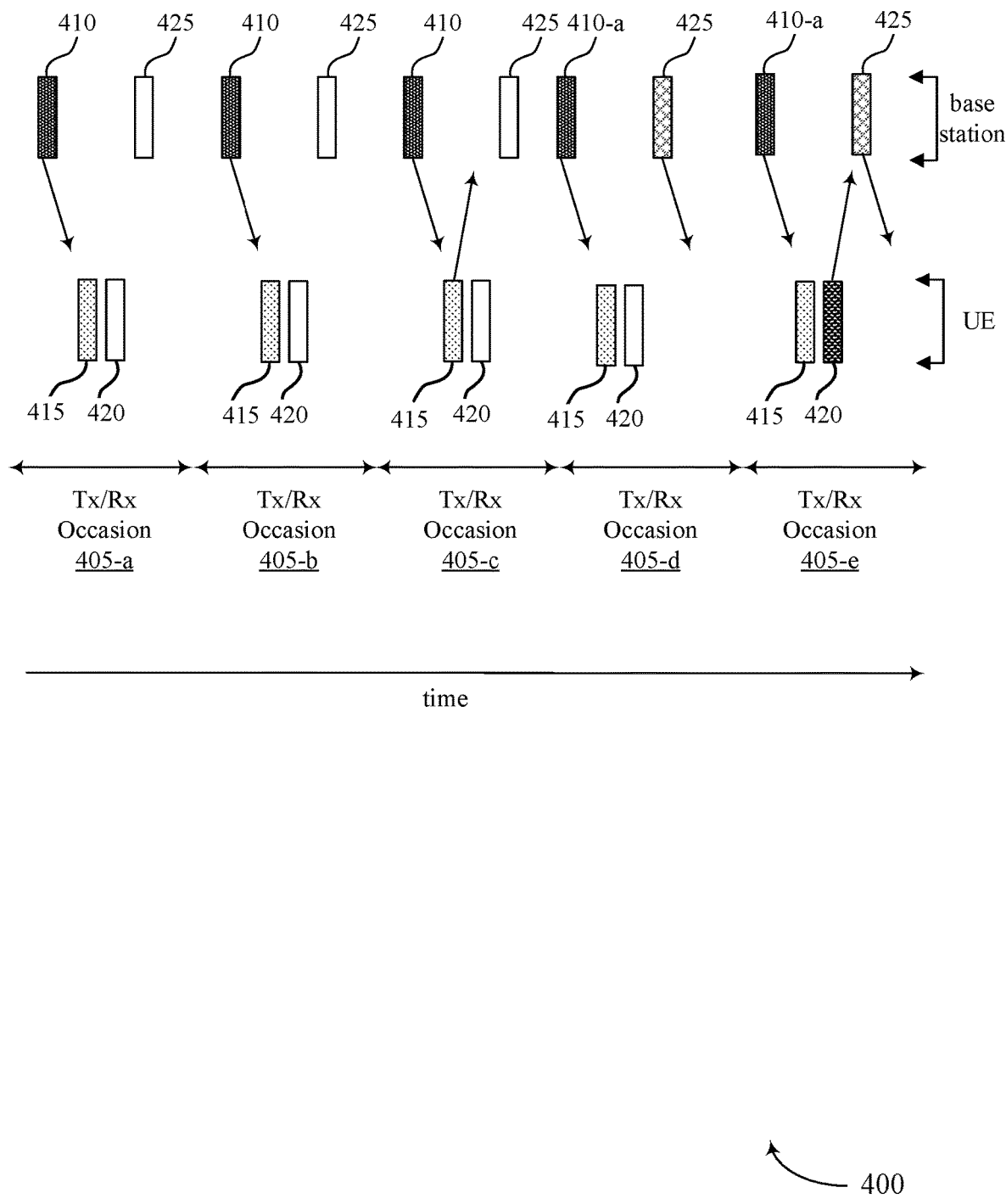
FIG. 4 illustrates an example of a timing diagram that supports signaling to wake up a cell in accordance with aspects of the present disclosure.

FIG. 4 illustrates an example of a timing diagram 400 that supports signaling to wake up a cell in accordance with aspects of the present disclosure. In some examples, the timing diagram 400 may be implemented by or may implement aspects of the wireless communications system 100 or 200.

During a first transmission and reception occasion 405-*a* and a second transmission and reception occasion 405-*b*, a base station 105 may transmit an SSB 410 that includes a first type of PBCH. The first type of PBCH (PBCH1) indicates that the base station 105 is not currently transmitting an SIB1 425 and a second type of PBCH. Accordingly, the UE 115 may not be able to determine and configure a RACH occasion 420. The PBCH1 within the SSB 410 may indicate the resources for transmitting a cell wake-up signal 415 to the base station 105. The PBCH1 may not indicate a CORESET for communications between the UE 115 and the base station 105. The base station 105 may also monitor for a cell wake-up signal 415 in the resources indicated for the cell wake-up signal 415.

During the third transmission and reception occasion 405-*c*, the UE 115 may transmit the cell wake-up signal 415 to the base station 105, which the base station 105 may monitor for and receive, using the resources indicated in the PBCH1 received in the second transmission and reception occasion 405-*b*.

In response, during the fourth transmission and reception occasion 405-*d*, the base station 105 may transmit an SSB 410-*a* including both a PBCH1 and a second type of PBCH (PBCH2) that includes an indication of a CORESET configuration for communications between the UE 115 and the base station 105. The transmission of the SSB 410-*a* including the PBCH2 may indicate that the base station 105 is currently transmitting an SIB1 425. In some examples, the PBCH2 may be transmitted over a single transmission occasion. In some examples, the PBCH2 may be transmitted over multiple transmission occasions (and the UE 115 may combine the received PBCH2s over multiple PBCH occasions). The CORESET may indicate to the UE 115 a timing for monitoring for an SIB1 425 from the base station 105. The UE 115 may monitor for the SIB1 425 based on the CORESET configuration and receive the SIB1 425.

The UE 115 may determine the resources for a RACH occasion 420 based on the information within the SIB1 425. In the fifth transmission and reception occasion 405-*e*, the UE 115 may transmit a RACH message (e.g., a msg1) during the RACH occasion 420. The base station 105 may monitor for and receive the RACH message during the RACH occasion 420. The base station 105 and the UE 115 may complete a RACH procedure and establish communications.

Figure 5:
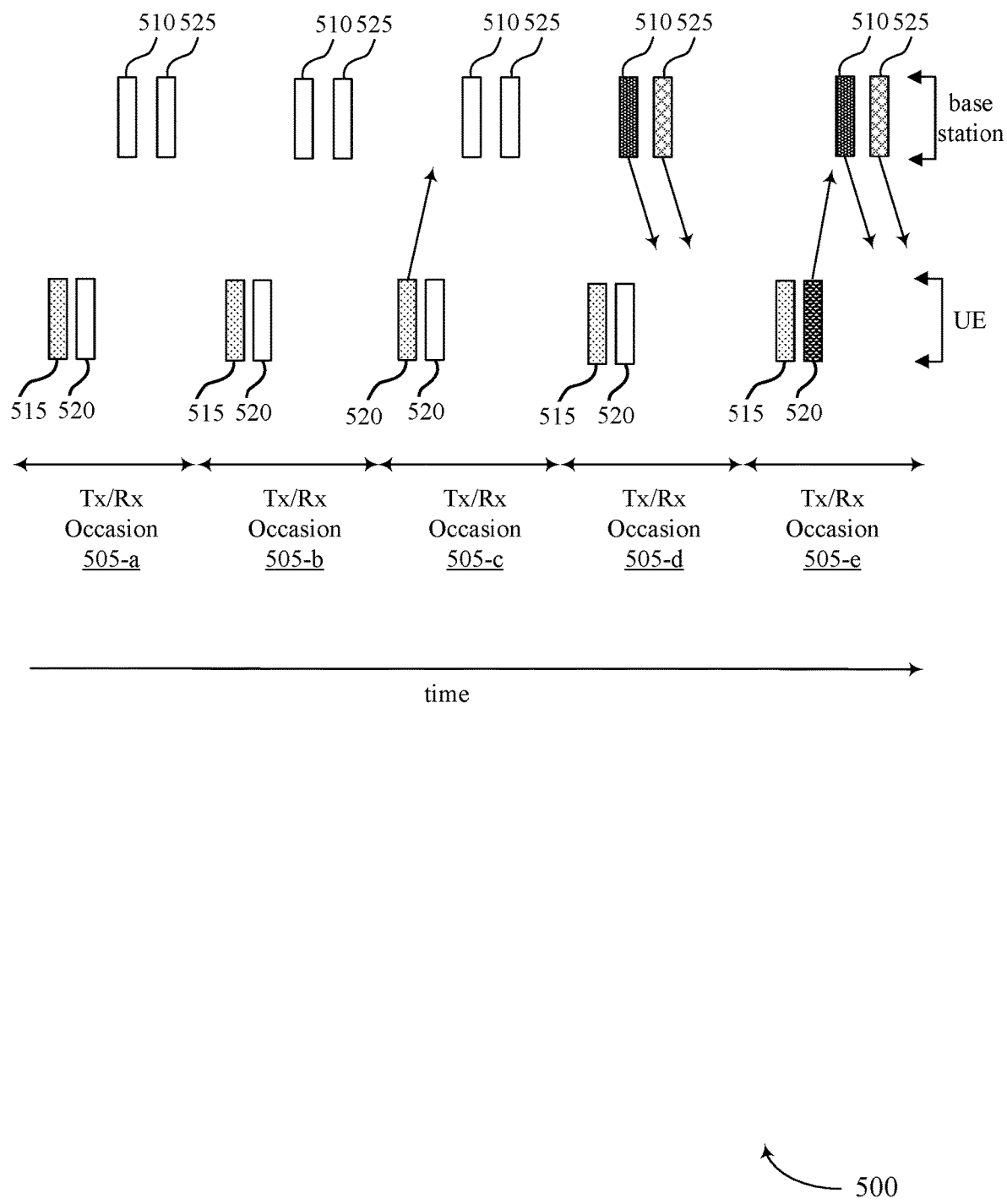
FIG. 5 illustrates an example of a timing diagram that supports signaling to wake up a cell in accordance with aspects of the present disclosure.

FIG. 5 illustrates an example of a timing diagram 500 that supports signaling to wake up a cell in accordance with aspects of the present disclosure. In some examples, the timing diagram 300 may be implemented by or may implement aspects of the wireless communications system 100 or 200.

During a first transmission and reception occasion 505-*a* and a second transmission and reception occasion 505-*b*, a base station 105 may not transmit an SSB 510 or an SIB 525. For example, the base station 105 may be operating in an SSB on-demand mode (e.g., a reduced power mode).

The UE 115 may determine that the UE 115 is within the geographic coverage area of the base station 105 but has not received an SSB 510 during the first transmission and reception occasion 505-*a* or the second transmission and reception occasion 505-*b*. For example, the UE 115 may receive and determine location information from one or more GPS satellites, or the UE 115 may receive and determine location information from another source (e.g., a mobility procedure). In some examples, the UE 115 may be notified that the UE 115 is within the geographic coverage area of the base station 105 via an indication transmitted from a coverage cell.

In the third transmission and reception occasion 505-*c*, the UE 115 may transmit a cell wake-up signal 515 to the base station 105. The resources for cell wake-up signal 515 may be pre-configured. For example, the UE 115 may have received an indication of the resources for transmitting the cell wake-up signal 515 when the UE 115 was previously in a connected state with the base station 105 or with another base station 105. In some examples, the UE 115 may receive an indication of the resources for transmitting the cell wake-up signal 515 from a coverage cell. In some examples, the resources for transmitting cell wake-up signals 515 to base stations 105 may be pre-configured or standardized (e.g., synchronized for all base stations 105 within a geographic area). In some examples, the resources for transmitting the cell wake-up signal 515 may be fixed based on an absolute timing (e.g., base stations 105 may monitor for cell wake-up signals 515 according to a fixed timing), and the UE 115 may receive an indication of the timing from a synchronization source such as the coverage cell or a GPS satellite. The UE 115 may determine the frequency resources for transmitting the cell wake-up signal 515 based on a frequency band search. For example, different cell wake-up signals may be configured at different frequency bands. The UE 115 may perform a frequency band search based on a look-up table associated with a location of the UE 115 or particular network operators. The base station 105 may monitor for the cell wake-up signal 515 using the pre-configured resources.

In response to receiving the cell wake-up signal 515, during the fourth transmission and reception occasion 505-*d*, the base station 105 may transmit an SSB 510 indicating that the base station 105 is currently transmitting an SIB1 525. For example, the SSB 510 may indicate that that the base station 105 is currently transmitting SIB1 525 via an indication field in PBCH, a DMRS sequence type, or a PSS or SSS sequence type. The base station 105 may also transmit the SIB1 525. In some examples, the UE 115 may monitor for the SIB1 525 based on the indication in the SSB 510 that the base station 105 is currently transmitting the SIB1 525.

The UE 115 may determine the resources for a RACH occasion 520 based on the information within the SIB1 525. In the fifth transmission and reception occasion 505-*e*, the UE 115 may transmit a RACH message (e.g., a msg1) during the RACH occasion 520. The base station 105 may monitor for and receive the RACH message during the RACH occasion 520. The base station 105 and the UE 115 may complete a RACH procedure and establish communications.

Figure 6:
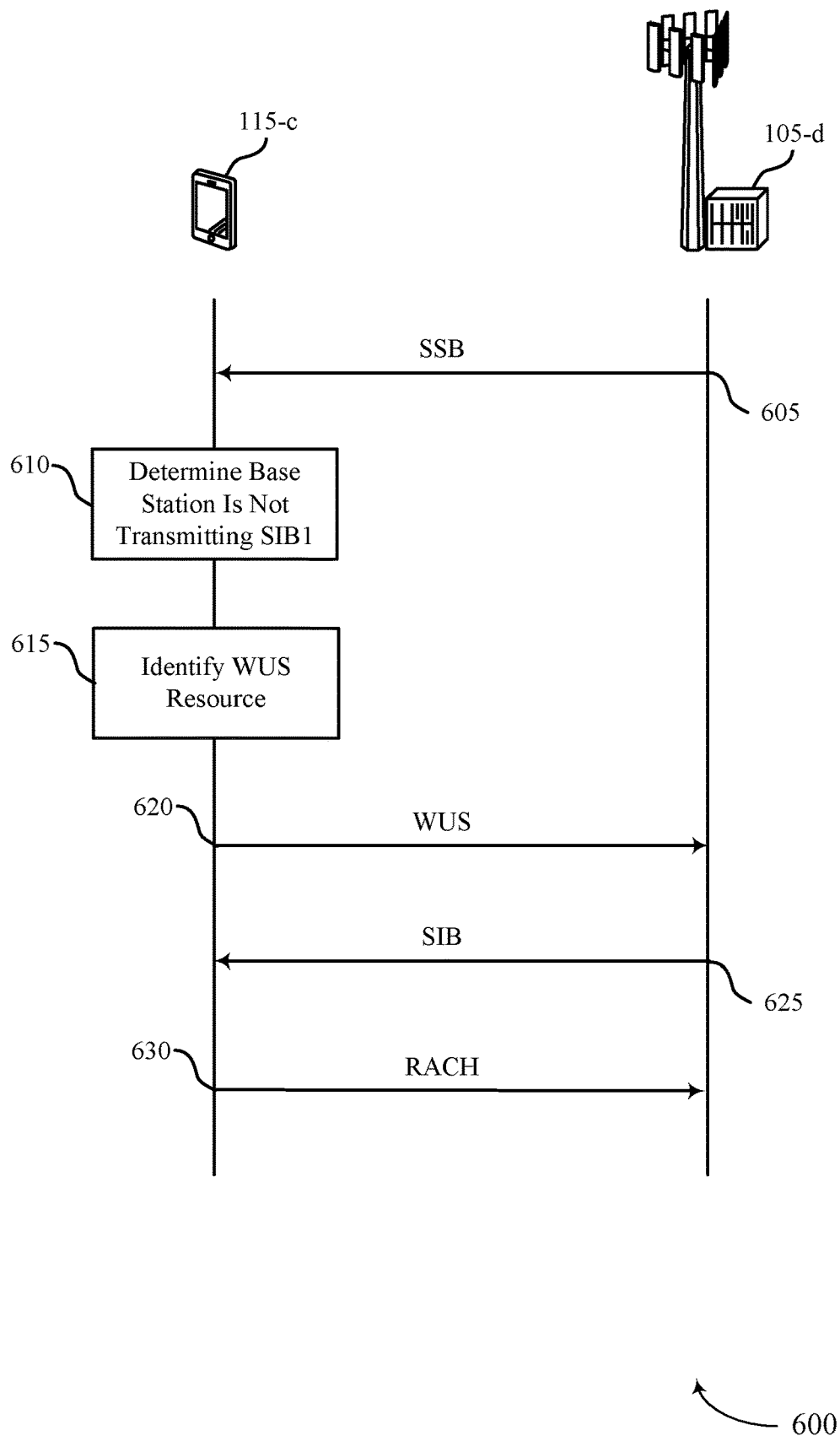
FIG. 6 illustrates an example of a timing diagram that supports signaling to wake up a cell in accordance with aspects of the present disclosure.

FIG. 6 illustrates an example of a process flow 600 that supports signaling to wake up a cell in accordance with aspects of the present disclosure. In some examples, the process flow 600 may be implemented by or may implement aspects of the wireless communications system 100 or 200. The process flow 600 may include a UE 115-*c*, which may be an example of a UE 115 as described herein. The process flow 600 may also include a base station 105-*d*, which may be an example of the base station 105 as described herein. In the following description of the process flow 600, the operations between the base station 105-*d* and the UE 115-*c* may be transmitted in a different order than the example order shown, or the operations performed by the base station 105-*d* and the UE 115-*c* may be performed in different orders or at different times. Some operations may also be omitted from the process flow 600, and other operations may be added to the process flow 600.

At 605, the UE 115-*c* may receive, from the base station 105-*d*, an SSB. The SSB may indicate that the base station 105-*d* is not currently transmitting an SIB1. In some examples, the SSB may lack an association (e.g., may not indicate resources for monitoring for) an SIB1. In some examples, the SSB may include a PBCH that may indicate that the base station 105-*d* is not currently transmitting an SIB1. In some examples, a PSS or an SSS within the SSB may indicate that the base station 105-*d* is not currently transmitting an SIB1. In some examples, the UE 115-*c* may receive, and the base station 105-*d* may transmit, the SSB over a single transmission and reception occasion. In some examples, the UE 115-*c* may receive, and the base station 105-*d* may transmit, the SSB over multiple transmission and reception occasions or during a duration of time.

At 610, the UE 115-*c* may determine that the base station 105-*d* is not currently transmitting an SIB1. For example, the UE 115-*c* may determine that the base station 105-*d* is not currently transmitting an SIB1 based on an indication in the SSB received at 605.

In some examples, the base station 105-*d* also does not periodically transmit SSBs (e.g., the base station 105-*d* may operate in an SSB on-demand mode). For example, the UE 115-*c* may determine that the UE 115-*c* is within the geographic coverage area of the base station 105-*d* but has not received an SSB during from the base station 105-*d*. For example, the UE 115-*c* may receive and determine location information from one or more GPS satellites, or the UE 115-*c* may receive and determine location information from another source (e.g., a mobility procedure). In some examples, the UE 115-*c* may be notified that the UE 115-*c* is within the geographic coverage area of the base station 105-*d* via an indication transmitted from a coverage cell.

At 615, the UE 115-*c* may identify a cell wake-up signal resource for transmission of a cell wake-up signal. In some examples, the SSB received at 605 may indicate the cell wake-up signal resource.

In some examples, where the base station 105-*d* also does not periodically transmit SSBs (e.g., the base station 105-*d* may operate in an SSB on-demand mode), the cell wake-up signal resource may be pre-configured. For example, the UE 115-*c* may have received an indication of the cell wake-up signal resource when the UE 115-*c* was previously in a connected state with the base station 105-*d* or with another base station 105. In some examples, the UE 115-*c* may receive an indication of the cell wake-up signal resource from a coverage cell. In some examples, the cell wake-up signal resource may be pre-configured or standardized (e.g., synchronized for all base stations 105 within a geographic area). In some examples, the cell wake-up signal resource may be fixed based on an absolute timing (e.g., base stations 105 may monitor for cell wake-up signals according to a fixed timing), and the UE 115-*c* may receive an indication of the timing from a synchronization source such as the coverage cell or a GPS satellite. The UE 115-*c* may determine the frequency band of the cell wake-up signal resource based on a frequency band search. For example, different cell wake-up signal resources may be configured at different frequency bands. The UE 115-*c* may perform a frequency band search based on a look-up table associated with a location of the UE 115-*c* or particular network operators. The base station 105-*d* may monitor for the cell wake-up signal using the pre-configured resources. In some examples, the cell wake-up signal resource is associated with the SSB on a per SSB basis.

At 620, the UE 115-c may transmit, and the base station 105-d may receive, the cell wake-up signal using the identified cell wake-up signal. In some examples, the UE 115-c may transmit, and the base station 105-d may receive, the cell wake-up signal over one transmission and reception occasion. In some examples, the UE 115-c may transmit, and the base station 105-d may receive, the cell wake-up signal over multiple transmission and reception occasions. In some examples, the SSB received at 605 may indicate whether the UE 115-c should transmit the cell wake-up signal over a single transmission and reception occasion or over multiple transmission and reception occasions. In some examples, the UE 115-c may transmit the cell wake-up signal via a PRACH sequence.

At 625, the base station 105-d may transmit, to the UE 115-c, an SIB (e.g., SIB1) indicating a random access transmission resource (e.g., a RACH occasion).

At 630, the UE 115-c may transmit, and the base station 105-d may receive, a random access channel message using the indicated RACH transmission resource. For example, the UE 115-c may determine the resources for a random access message based on the SIB received at 625. In some examples, the UE 115-c may transmit a RACH message (e.g., a msg1) during the indicated RACH occasion. The base station 105-d may monitor for and receive the RACH message during the RACH occasion. The base station 105-d and the UE 115-c may complete a RACH procedure and establish communications.

Figure 7:
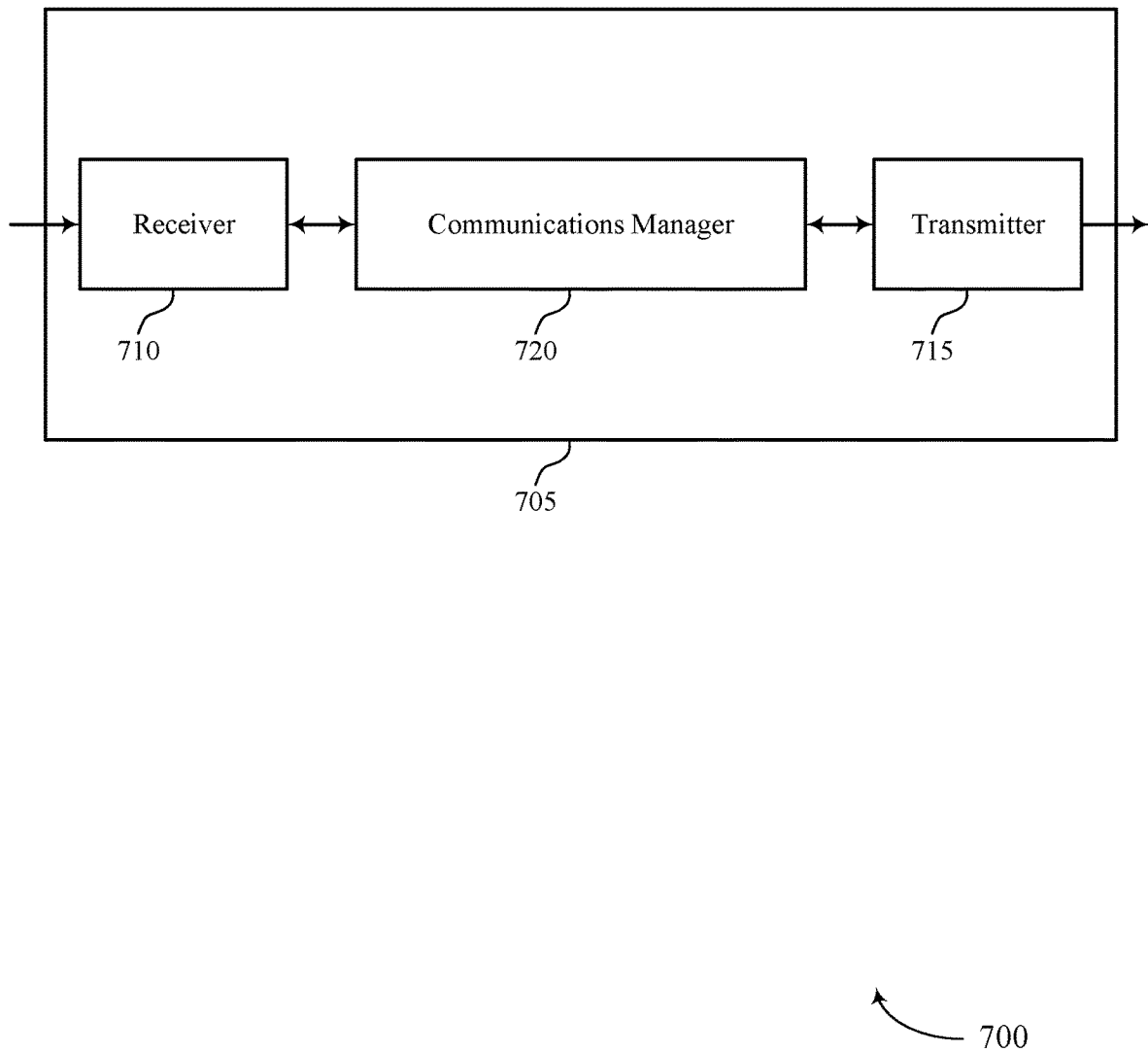
FIGS. 7 and 8 show block diagrams of devices that support signaling to wake up a cell in accordance with aspects of the present disclosure.

FIG. 7 shows a block diagram 700 of a device 705 that supports signaling to wake up a cell in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to signaling to wake up a cell). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to signaling to wake up a cell). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of signaling to wake up a cell as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for identifying a cell wake-up signal resource for transmission of a cell wake-up signal. The communications manager 720 may be configured as or otherwise support a means for transmitting, to a base station, a cell wake-up signal over the cell wake-up signal resource. The communications manager 720 may be configured as or otherwise support a means for receiving, from the base station and in response to the cell wake-up signal, an SIB that is indicative of a random access transmission resource. The communications manager 720 may be configured as or otherwise support a means for transmitting, to the base station, a random access channel message over the random access transmission resource.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for may support techniques for reduced power consumption at a base station by facilitating lower power consumption at the base station by reducing transmission of periodic signals.

Figure 8:
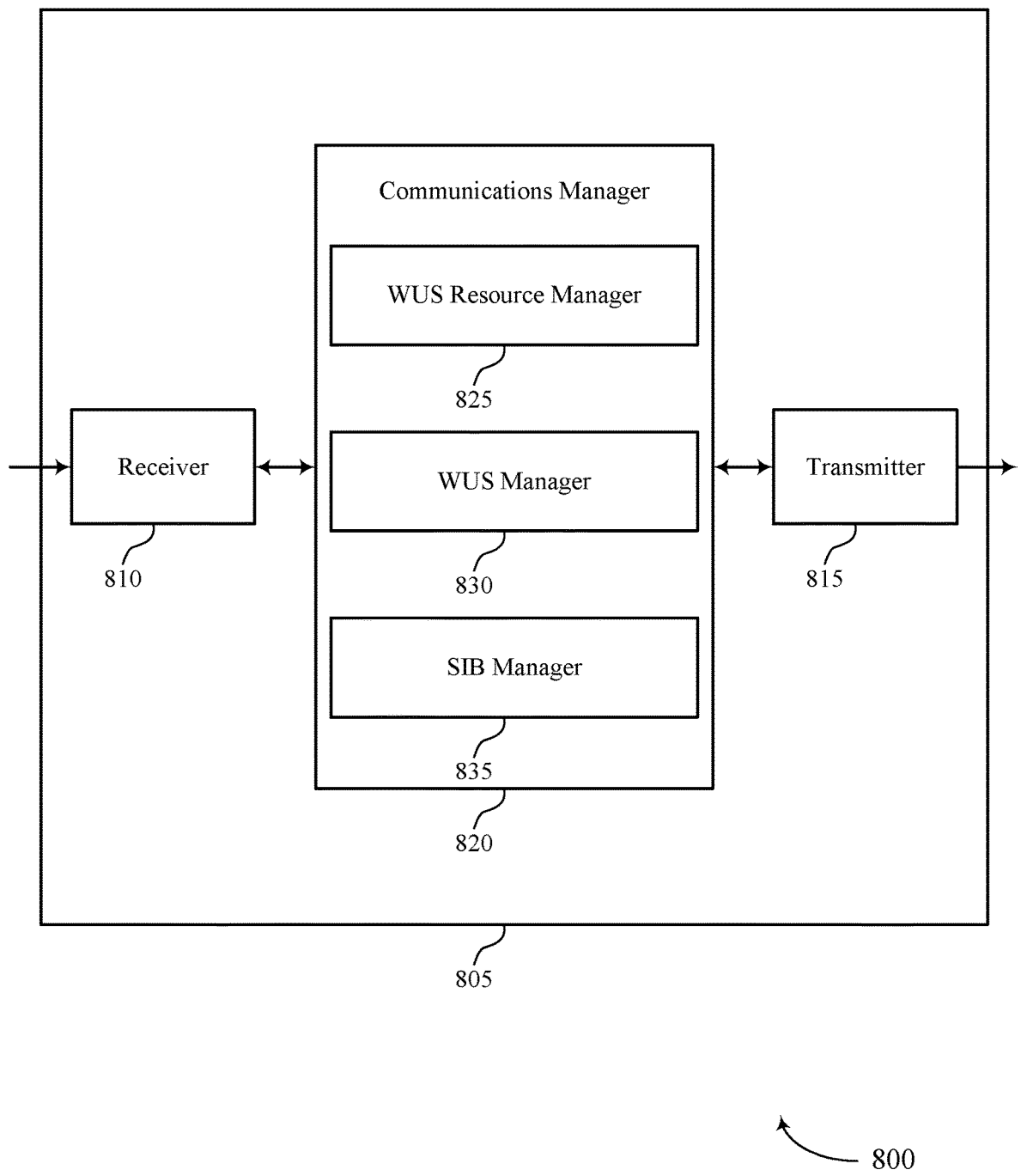

FIG. 8 shows a block diagram 800 of a device 805 that supports signaling to wake up a cell in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to signaling to wake up a cell). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to signaling to wake up a cell). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of signaling to wake up a cell as described herein. For example, the communications manager 820 may include a wake-up signal (WUS) resource manager 825, a WUS manager 830, an SIB manager 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The WUS resource manager 825 may be configured as or otherwise support a means for identifying a cell wake-up signal resource for transmission of a cell wake-up signal. The WUS manager 830 may be configured as or otherwise support a means for transmitting, to a base station, a cell wake-up signal over the cell wake-up signal resource. The SIB manager 835 may be configured as or otherwise support a means for receiving, from the base station and in response to the cell wake-up signal, an SIB that is indicative of a random access transmission resource.

Figure 9:
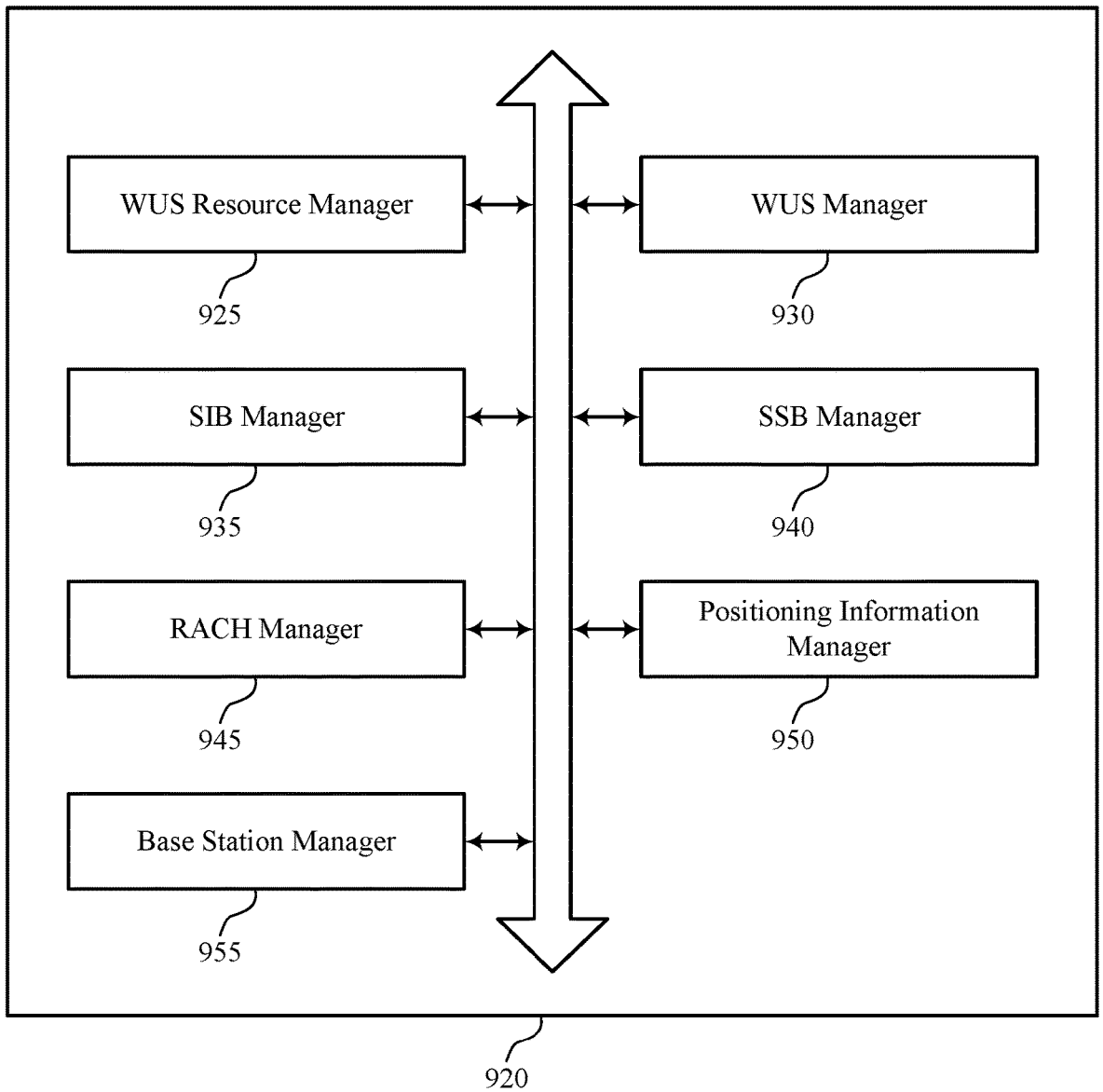
FIG. 9 shows a block diagram of a communications manager that supports signaling to wake up a cell in accordance with aspects of the present disclosure.

FIG. 9 shows a block diagram 900 of a communications manager 920 that supports signaling to wake up a cell in accordance with aspects of the present disclosure. The communications manager 920 may be an example of aspects of a communications manager 720, a communications manager 820, or both, as described herein. The communications manager 920, or various components thereof, may be an example of means for performing various aspects of signaling to wake up a cell as described herein. For example, the communications manager 920 may include a WUS resource manager 925, a WUS manager 930, an SIB manager 935, an SSB manager 940, a RACH manager 945, a Positioning information manager 950, a base station manager 955, or any combination thereof. Each of these components may communicate, directly or indirectly, with one another (e.g., via one or more buses).

The communications manager 920 may support wireless communications at a UE in accordance with examples as disclosed herein. The WUS resource manager 925 may be configured as or otherwise support a means for identifying a cell wake-up signal resource for transmission of a cell wake-up signal. The WUS manager 930 may be configured as or otherwise support a means for transmitting, to a base station, a cell wake-up signal over the cell wake-up signal resource. The SIB manager 935 may be configured as or otherwise support a means for receiving, from the base station and in response to the cell wake-up signal, an SIB that is indicative of a random access transmission resource.

In some examples, the SSB manager 940 may be configured as or otherwise support a means for receiving, from the base station, an SSB, where the SSB includes an indication that the base station is not currently transmitting the SIB.

In some examples, the indication that the base station is not currently transmitting the SIB may include a PBCH, a PSS, or an SSS.

In some examples, the WUS manager 930 may be configured as or otherwise support a means for transmitting the cell wake-up signal based on the indication that the base station is not currently transmitting the SIB.

In some examples, to support receiving the indication that the base station is not currently transmitting the SIB, the SSB manager 940 may be configured as or otherwise support a means for receiving the indication that the base station is not currently transmitting the SIB via at least one of a PBCH, a PSS, or an SSS.

In some examples, the SSB manager 940 may be configured as or otherwise support a means for receiving, with the SSB, a PBCH indicating a resource configuration for the cell wake-up signal resource.

In some examples, the cell wake-up signal resource is associated with the SSB on a per SSB basis.

In some examples, to support transmitting the cell wake-up signal, the RACH manager 945 may be configured as or otherwise support a means for transmitting the cell wake-up signal via a physical random access channel sequence.

In some examples, to support receiving the SIB, the SIB manager 935 may be configured as or otherwise support a means for receiving the SIB over at least one reception occasion of a set of multiple reception occasions or during a duration of time.

In some examples, to support receiving the SIB, the SIB manager 935 may be configured as or otherwise support a means for receiving the SIB over a single reception occasion.

In some examples, the SSB manager 940 may be configured as or otherwise support a means for receiving, from the base station, a first SSB including a first PBCH indicative of the cell wake-up signal resource, where identifying the cell wake-up signal resource is based on receiving the first PBCH. In some examples, the SSB manager 940 may be configured as or otherwise support a means for receiving, from the base station and in response to transmission of the cell wake-up signal, a second SSB associated with the SIB and including a second PBCH indicative of a control resource set configuration.

In some examples, the WUS manager 930 may be configured as or otherwise support a means for identifying that the UE has not received an SSB from the base station, where transmitting the cell wake-up signal is based on the identifying.

In some examples, the Positioning information manager 950 may be configured as or otherwise support a means for receiving positioning information for the UE. In some examples, the base station manager 955 may be configured as or otherwise support a means for identifying the base station based on the positioning information.

In some examples, the SIB includes an SIB1.

In some examples, the RACH manager 945 may be configured as or otherwise support a means for transmitting, to the base station, a random access channel message over the random access transmission resource.

Figure 10:
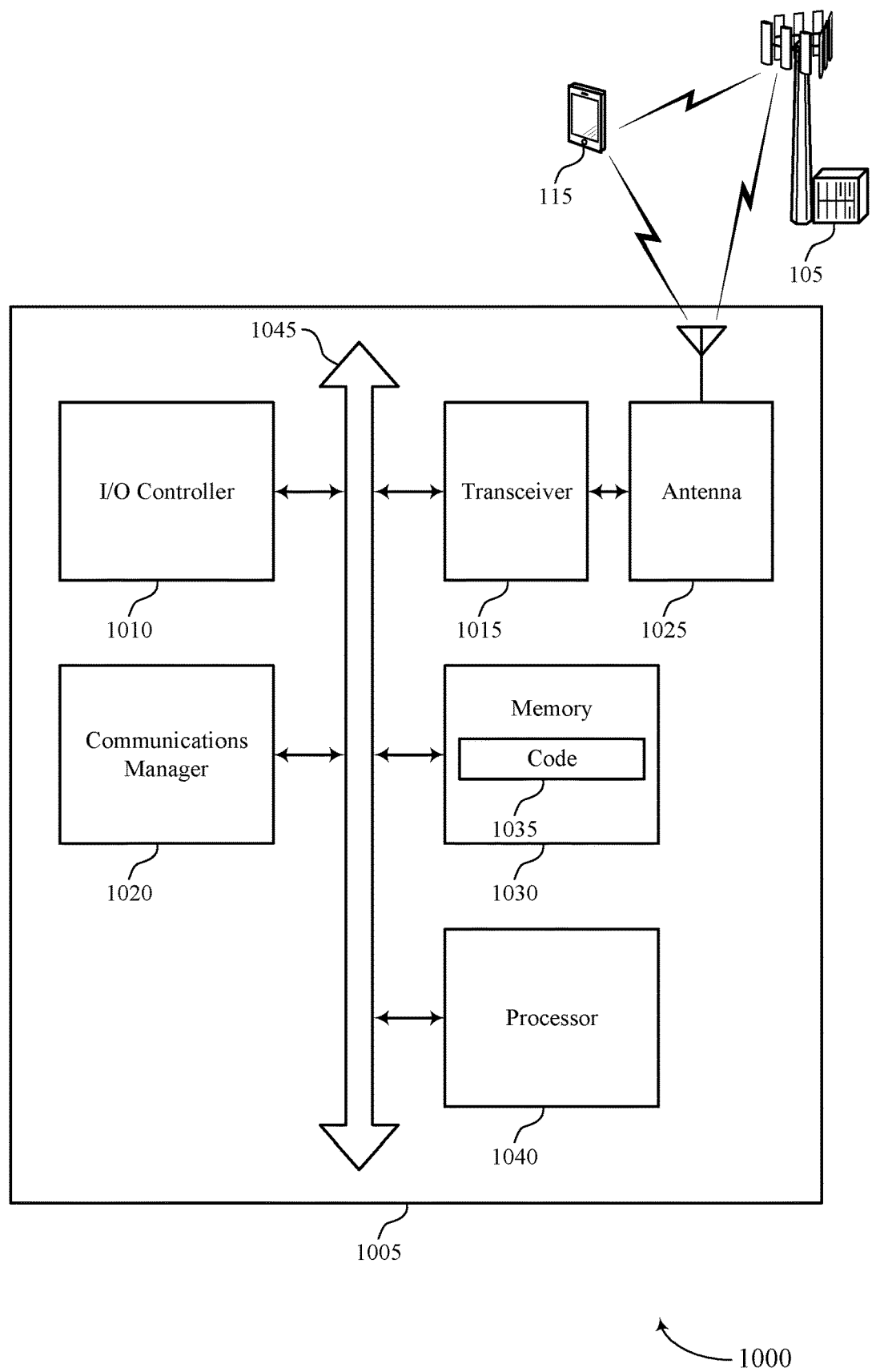
FIG. 10 shows a diagram of a system including a device that supports signaling to wake up a cell in accordance with aspects of the present disclosure.

FIG. 10 shows a diagram of a system 1000 including a device 1005 that supports signaling to wake up a cell in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting signaling to wake up a cell). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for identifying a cell wake-up signal resource for transmission of a cell wake-up signal. The communications manager 1020 may be configured as or otherwise support a means for transmitting, to a base station, a cell wake-up signal over the cell wake-up signal resource. The communications manager 1020 may be configured as or otherwise support a means for receiving, from the base station and in response to the cell wake-up signal, an SIB that is indicative of a random access transmission resource. The communications manager 1020 may be configured as or otherwise support a means for transmitting, to the base station, a random access channel message over the random access transmission resource.

By including or configuring the communications manager 1020 in accordance with examples as described herein, the device 1005 may support techniques for reduced power consumption and improved coordination between devices by facilitating lower power consumption at the base station by reducing transmission of periodic signals and facilitating the establishment of communications between a UE and a base station that reduces transmission of periodic signals.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of signaling to wake up a cell as described herein, or the processor 1040 and the memory 1030 may be otherwise configured to perform or support such operations.

Figure 11:
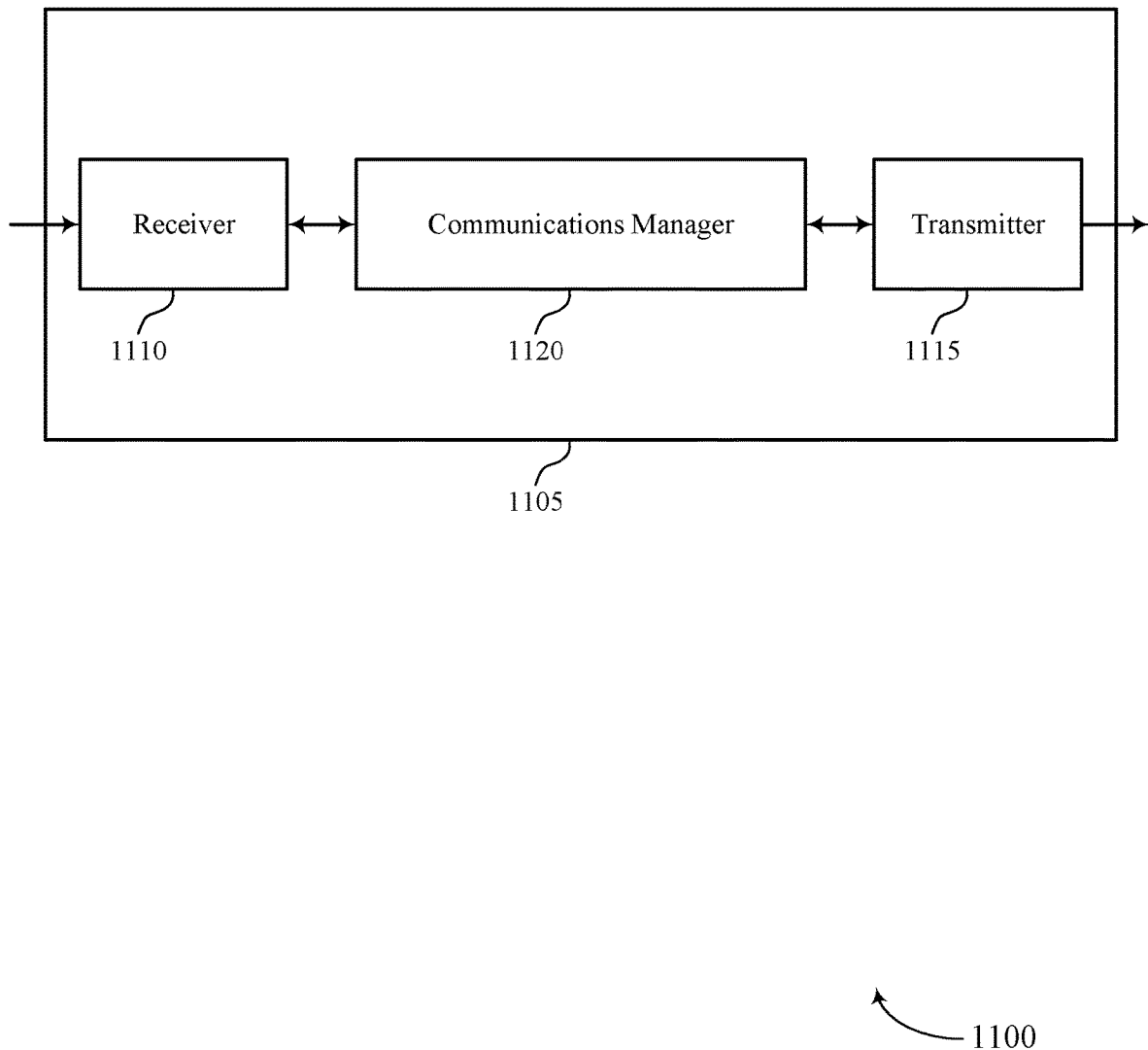
FIGS. 11 and 12 show block diagrams of devices that support signaling to wake up a cell in accordance with aspects of the present disclosure.

FIG. 11 shows a block diagram 1100 of a device 1105 that supports signaling to wake up a cell in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to signaling to wake up a cell). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to signaling to wake up a cell). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of signaling to wake up a cell as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. For example, the communications manager 1120 may be configured as or otherwise support a means for receiving, from a UE, a cell wake-up signal over a cell wake-up signal resource. The communications manager 1120 may be configured as or otherwise support a means for transmitting, to the UE and in response to the cell wake-up signal, an SIB that is indicative of a random access transmission resource for communications between the UE and the base station. The communications manager 1120 may be configured as or otherwise support a means for receiving, from the UE, a random access channel message over the random access transmission resource, in accordance with the SIB.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced power consumption at a base station by facilitating lower power consumption at the base station by reducing transmission of periodic signals.

Figure 12:
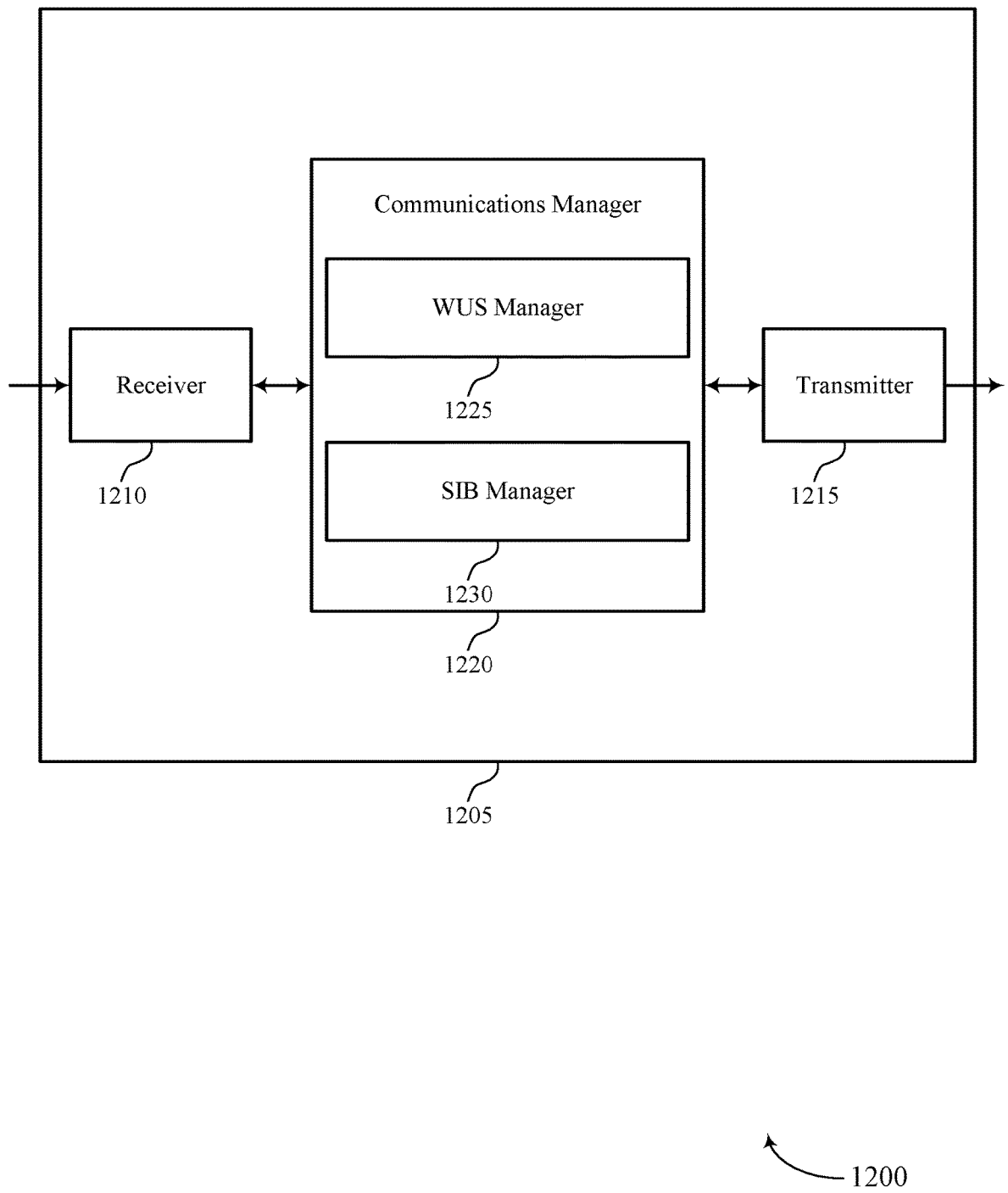

FIG. 12 shows a block diagram 1200 of a device 1205 that supports signaling to wake up a cell in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to signaling to wake up a cell). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to signaling to wake up a cell). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of signaling to wake up a cell as described herein. For example, the communications manager 1220 may include a WUS manager 1225 an SIB manager 1230, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. The WUS manager 1225 may be configured as or otherwise support a means for receiving, from a UE, a cell wake-up signal over a cell wake-up signal resource. The SIB manager 1230 may be configured as or otherwise support a means for transmitting, to the UE and in response to the cell wake-up signal, an SIB that is indicative of a random access transmission resource for communications between the UE and the base station.

Figure 13:
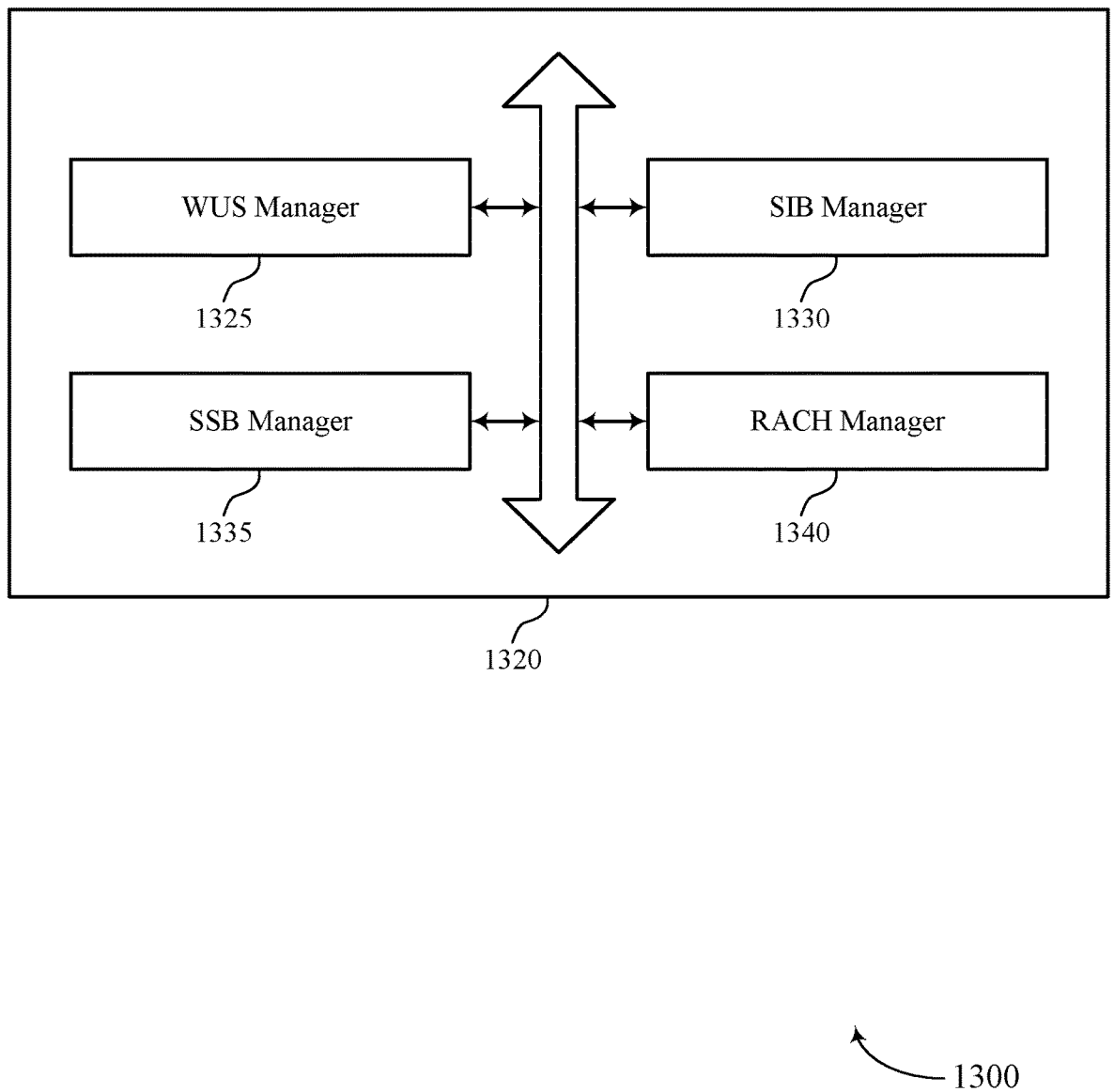
FIG. 13 shows a block diagram of a communications manager that supports signaling to wake up a cell in accordance with aspects of the present disclosure.

FIG. 13 shows a block diagram 1300 of a communications manager 1320 that supports signaling to wake up a cell in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of signaling to wake up a cell as described herein. For example, the communications manager 1320 may include a WUS manager 1325, an SIB manager 1330, an SSB manager 1335, a RACH manager 1340, or any combination thereof. Each of these components may communicate, directly or indirectly, with one another (e.g., via one or more buses).

The communications manager 1320 may support wireless communications at a base station in accordance with examples as disclosed herein. The WUS manager 1325 may be configured as or otherwise support a means for receiving, from a UE, a cell wake-up signal over a cell wake-up signal resource. The SIB manager 1330 may be configured as or otherwise support a means for transmitting, to the UE and in response to the cell wake-up signal, an SIB that is indicative of a random access transmission resource for communications between the UE and the base station.

In some examples, the SSB manager 1335 may be configured as or otherwise support a means for transmitting, to the UE, an SSB, where the SSB includes an indication that the base station is not currently transmitting the SIB.

In some examples, the indication that the base station is not currently transmitting the SIB includes at least one of a PBCH, a PSS, or an SSS.

In some examples, WUS manager 1325 may be configured as or otherwise support a means for receiving the cell wake-up signal based on the indication that the base station is not currently transmitting the SIB.

In some examples, the SSB manager 1335 may be configured as or otherwise support a means for transmitting, with the SSB, a PBCH indicating a resource configuration for the cell wake-up signal resource.

In some examples, the cell wake-up signal resource is associated with the SSB on a per SSB basis.

In some examples, to support receiving the cell wake-up signal, the RACH manager 1340 may be configured as or otherwise support a means for receiving the cell wake-up signal via a physical random access channel sequence.

In some examples, to support transmitting the SIB, the SIB manager 1330 may be configured as or otherwise support a means for transmitting the SIB over at least one reception occasion of a set of multiple reception occasions or during a duration of time.

In some examples, to support transmitting the SIB, the SIB manager 1330 may be configured as or otherwise support a means for transmitting the SIB over a single reception occasion.

In some examples, the SSB manager 1335 may be configured as or otherwise support a means for transmitting, to the UE, a first SSB including a first PBCH indicative of the cell wake-up signal resource, where identifying the cell wake-up signal resource is based on receiving the first PBCH. In some examples, the SSB manager 1335 may be configured as or otherwise support a means for transmitting, to the UE and in response to reception of the cell wake-up signal, a second SSB associated with the SIB and including a second PBCH indicative of a control resource set configuration.

In some examples, the SIB includes an SIB1.

In some examples, the RACH manager 1340 may be configured as or otherwise support a means for receiving, from the UE, a random access channel message over the random access transmission resource, in accordance with the SIB.

Figure 14:
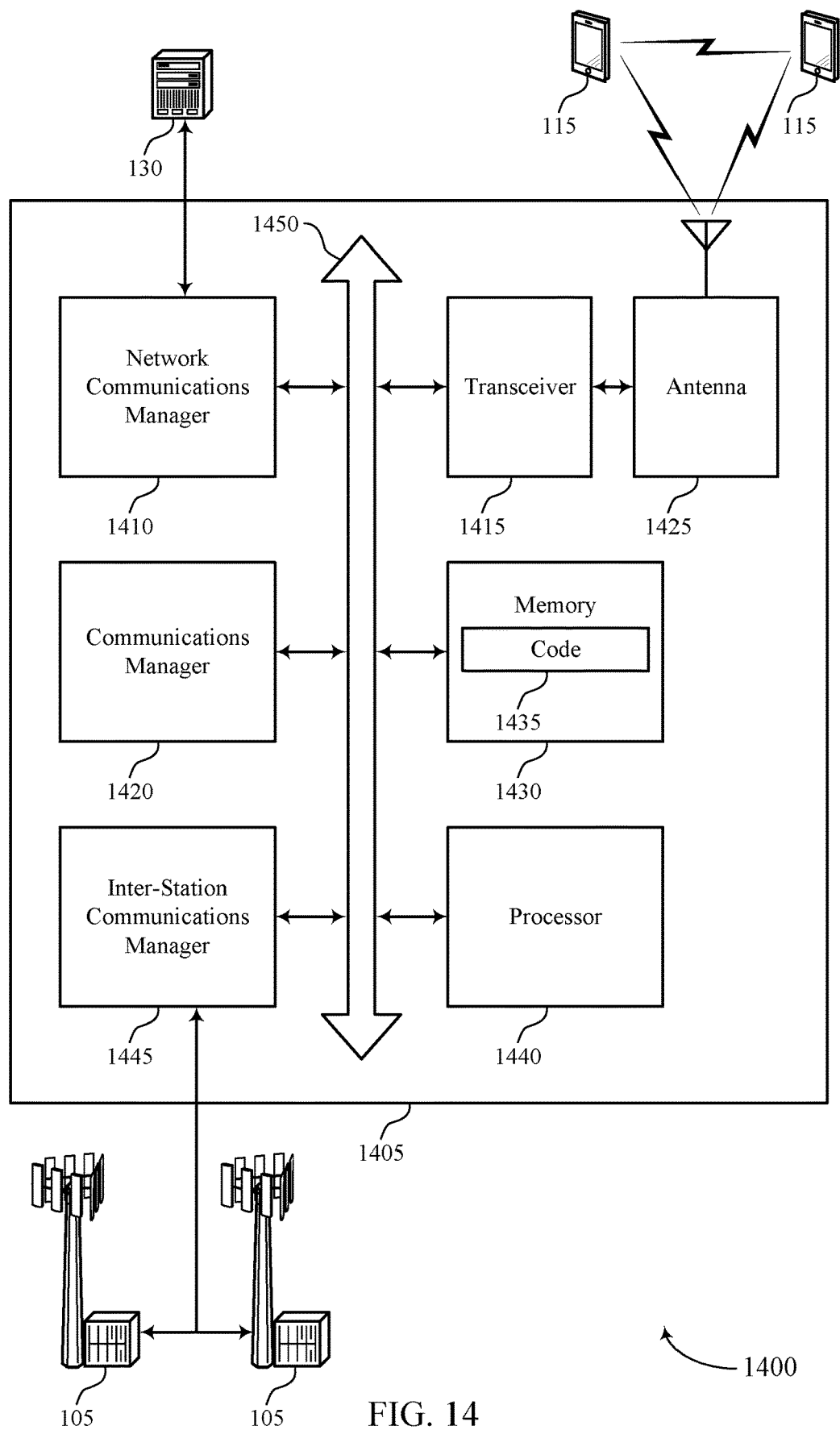
FIG. 14 shows a diagram of a system including a device that supports signaling to wake up a cell in accordance with aspects of the present disclosure.

FIG. 14 shows a diagram of a system 1400 including a device 1405 that supports signaling to wake up a cell in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting signaling to wake up a cell). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a base station in accordance with examples as disclosed herein. For example, the communications manager 1420 may be configured as or otherwise support a means for receiving, from a UE, a cell wake-up signal over a cell wake-up signal resource. The communications manager 1420 may be configured as or otherwise support a means for transmitting, to the UE and in response to the cell wake-up signal, an SIB that is indicative of a random access transmission resource for communications between the UE and the base station. The communications manager 1420 may be configured as or otherwise support a means for receiving, from the UE, a random access channel message over the random access transmission resource, in accordance with the SIB.

By including or configuring the communications manager 1420 in accordance with examples as described herein, the device 1405 may support techniques for reduced power consumption and improved coordination between devices by facilitating lower power consumption at the base station by reducing transmission of periodic signals and facilitating the establishment of communications between a UE and a base station that reduces transmission of periodic signals.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of signaling to wake up a cell as described herein, or the processor 1440 and the memory 1430 may be otherwise configured to perform or support such operations.

Figure 15:
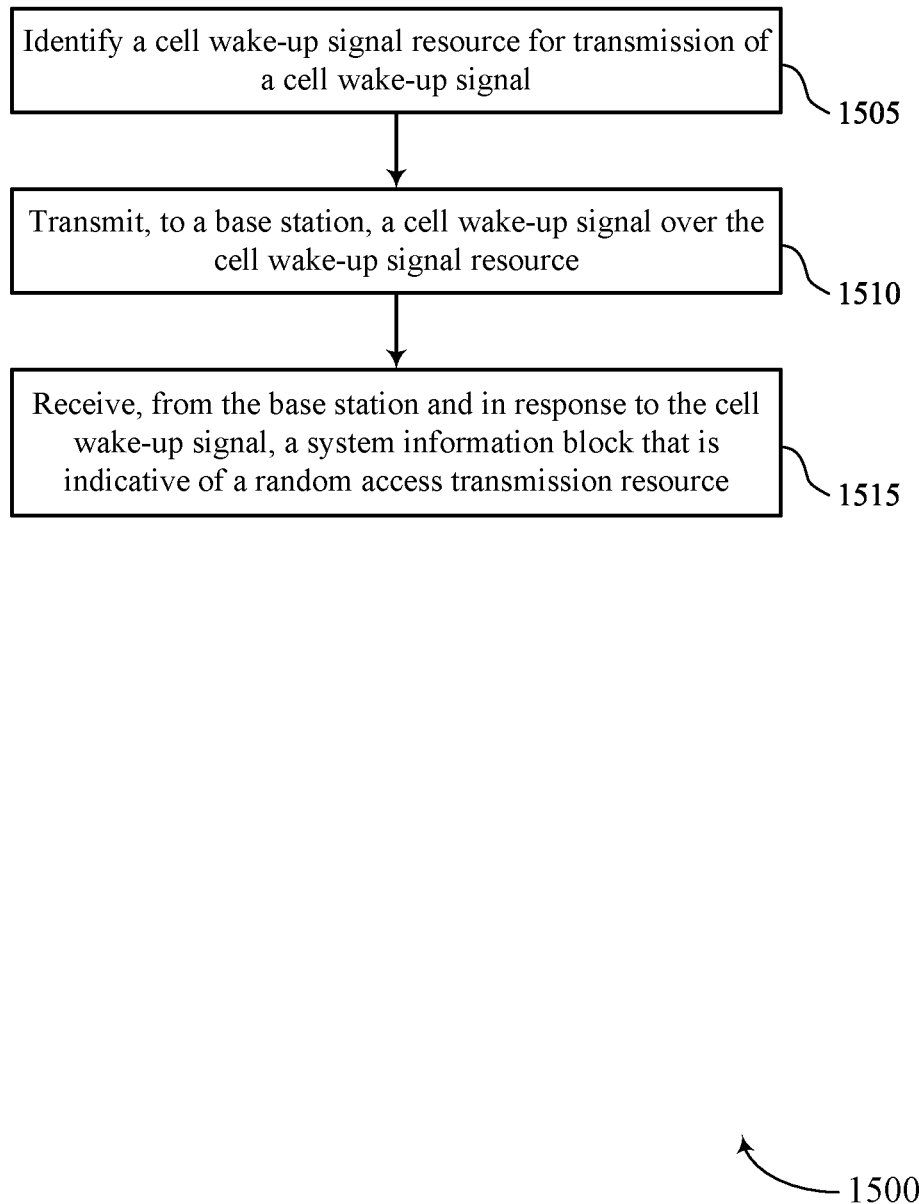
FIGS. 15 through 19 show flowcharts illustrating methods that support signaling to wake up a cell in accordance with aspects of the present disclosure.

FIG. 15 shows a flowchart illustrating a method 1500 that supports signaling to wake up a cell in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include identifying a cell wake-up signal resource for transmission of a cell wake-up signal. The operations of 1505 may be performed in accordance with examples as disclosed herein. In some examples, aspects of the operations of 1505 may be performed by a WUS resource manager 925 as described with reference to FIG. 9.

At 1510, the method may include transmitting, to a base station, a cell wake-up signal over the cell wake-up signal resource. The operations of 1510 may be performed in accordance with examples as disclosed herein. In some examples, aspects of the operations of 1510 may be performed by a WUS manager 930 as described with reference to FIG. 9.

At 1515, the method may include receiving, from the base station and in response to the cell wake-up signal, an SIB that is indicative of a random access transmission resource. The operations of 1515 may be performed in accordance with examples as disclosed herein. In some examples, aspects of the operations of 1515 may be performed by an SIB manager 935 as described with reference to FIG. 9.

Figure 16:
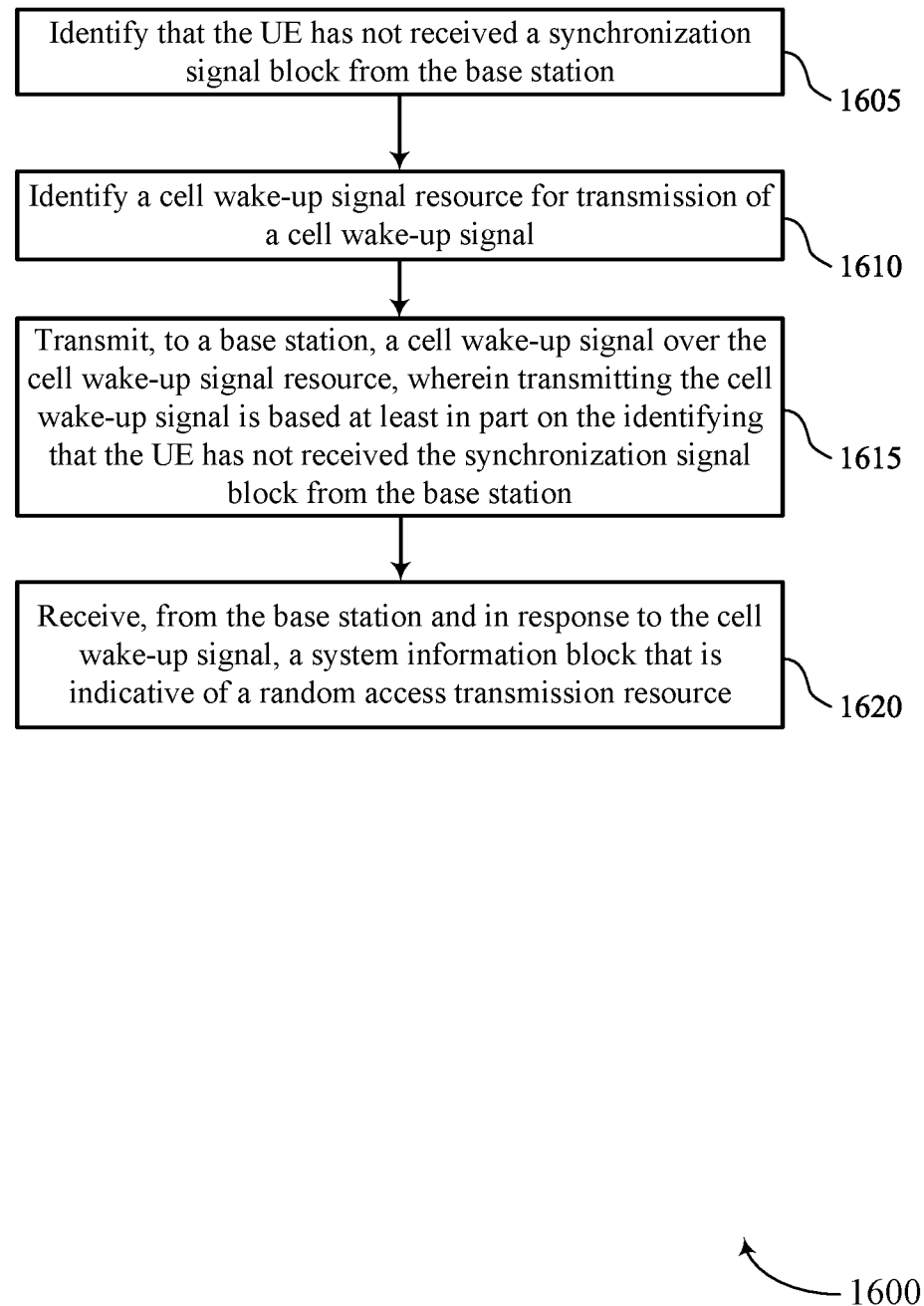

FIG. 16 shows a flowchart illustrating a method 1600 that supports signaling to wake up a cell in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include identifying that the UE has not received an SSB from the base station. The operations of 1605 may be performed in accordance with examples as disclosed herein. In some examples, aspects of the operations of 1605 may be performed by a WUS manager 930 as described with reference to FIG. 9.

At 1610, the method may include identifying a cell wake-up signal resource for transmission of a cell wake-up signal. The operations of 1610 may be performed in accordance with examples as disclosed herein. In some examples, aspects of the operations of 1610 may be performed by a WUS resource manager 925 as described with reference to FIG. 9.

At 1615, the method may include transmitting, to a base station, a cell wake-up signal over the cell wake-up signal resource, where transmitting the cell wake-up signal is based on the identifying that the UE has not received the SSB from the base station. The operations of 1615 may be performed in accordance with examples as disclosed herein. In some examples, aspects of the operations of 1615 may be performed by a WUS manager 930 as described with reference to FIG. 9.

At 1620, the method may include receiving, from the base station and in response to the cell wake-up signal, an SIB that is indicative of a random access transmission resource. The operations of 1620 may be performed in accordance with examples as disclosed herein. In some examples, aspects of the operations of 1620 may be performed by an SIB manager 935 as described with reference to FIG. 9.

Figure 17:
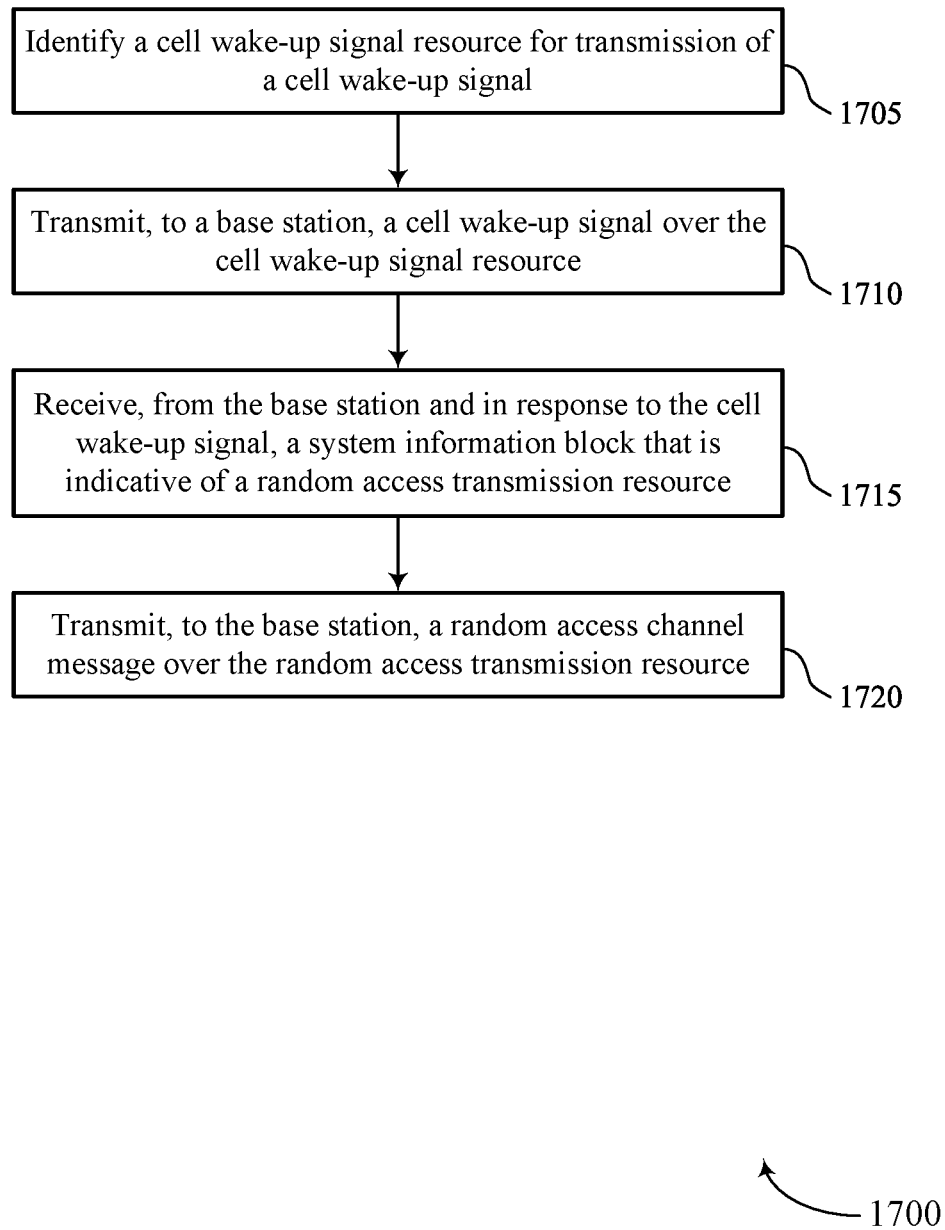

FIG. 17 shows a flowchart illustrating a method 1700 that supports signaling to wake up a cell in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include identifying a cell wake-up signal resource for transmission of a cell wake-up signal. The operations of 1705 may be performed in accordance with examples as disclosed herein. In some examples, aspects of the operations of 1705 may be performed by a WUS resource manager 925 as described with reference to FIG. 9.

At 1710, the method may include transmitting, to a base station, a cell wake-up signal over the cell wake-up signal resource. The operations of 1710 may be performed in accordance with examples as disclosed herein. In some examples, aspects of the operations of 1710 may be performed by a WUS manager 930 as described with reference to FIG. 9.

At 1715, the method may include receiving, from the base station and in response to the cell wake-up signal, an SIB that is indicative of a random access transmission resource. The operations of 1715 may be performed in accordance with examples as disclosed herein. In some examples, aspects of the operations of 1715 may be performed by an SIB manager 935 as described with reference to FIG. 9.

At 1720, the method may include transmitting, to the base station, a random access channel message over the random access transmission resource. The operations of 1720 may be performed in accordance with examples as disclosed herein. In some examples, aspects of the operations of 1720 may be performed by a RACH manager 945 as described with reference to FIG. 9.

Figure 18:
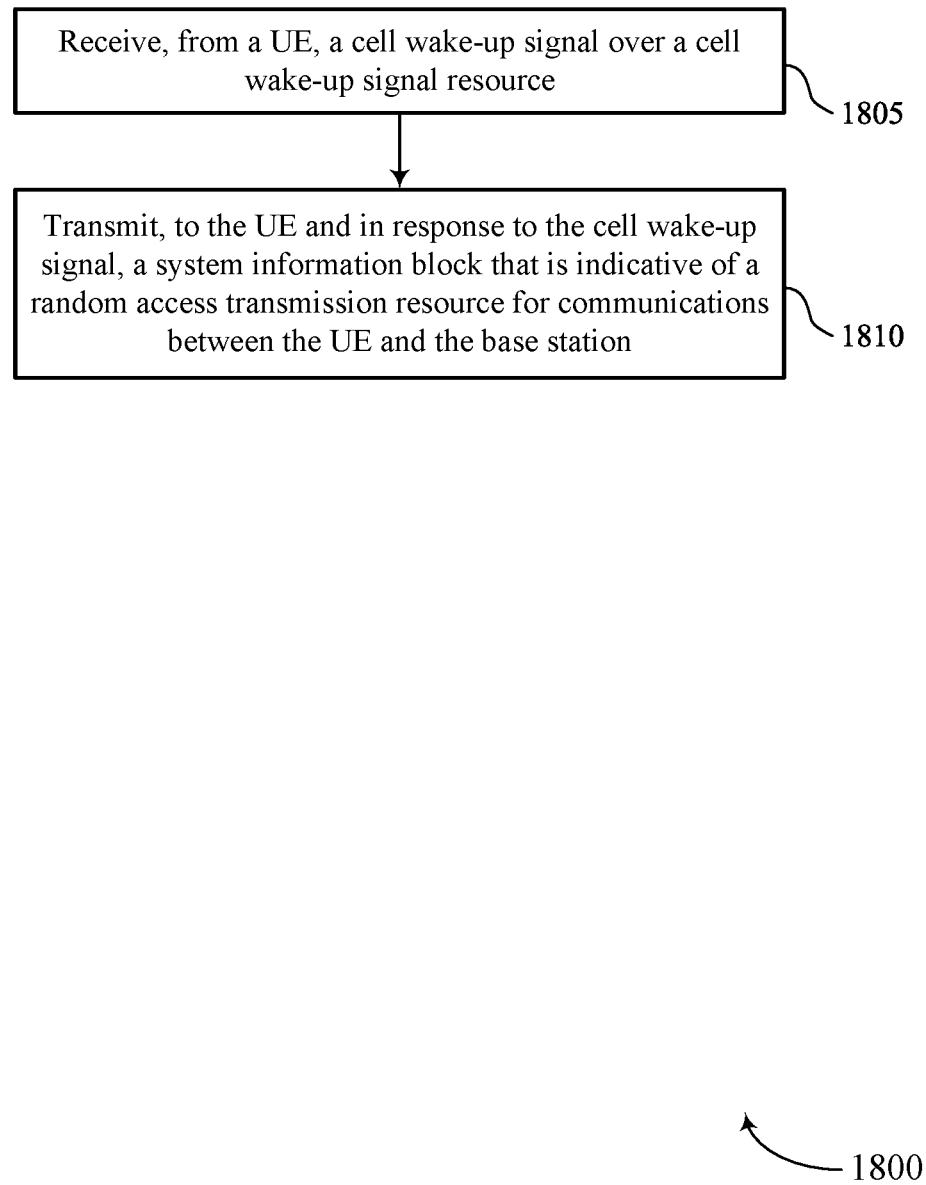

FIG. 18 shows a flowchart illustrating a method 1800 that supports signaling to wake up a cell in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include receiving, from a UE, a cell wake-up signal over a cell wake-up signal resource. The operations of 1805 may be performed in accordance with examples as disclosed herein. In some examples, aspects of the operations of 1805 may be performed by a WUS manager 1325 as described with reference to FIG. 13.

At 1810, the method may include transmitting, to the UE and in response to the cell wake-up signal, an SIB that is indicative of a random access transmission resource for communications between the UE and the base station. The operations of 1810 may be performed in accordance with examples as disclosed herein. In some examples, aspects of the operations of 1810 may be performed by an SIB manager 1330 as described with reference to FIG. 13.

Figure 19:
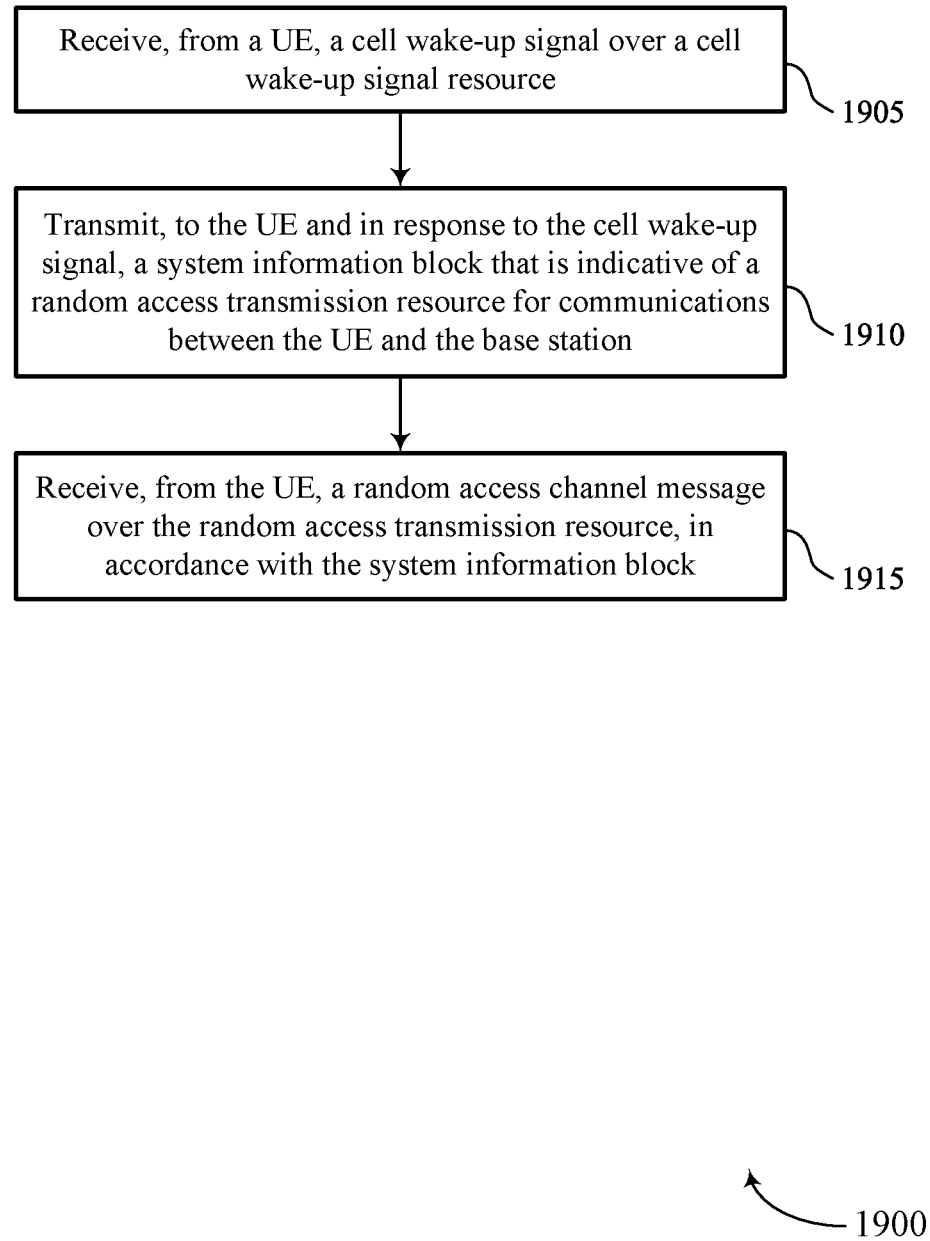

FIG. 19 shows a flowchart illustrating a method 1900 that supports signaling to wake up a cell in accordance with aspects of the present disclosure. The operations of the method 1900 may be implemented by a base station or its components as described herein. For example, the operations of the method 1900 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1905, the method may include receiving, from a UE, a cell wake-up signal over a cell wake-up signal resource. The operations of 1905 may be performed in accordance with examples as disclosed herein. In some examples, aspects of the operations of 1905 may be performed by a WUS manager 1325 as described with reference to FIG. 13.

At 1910, the method may include transmitting, to the UE and in response to the cell wake-up signal, an SIB that is indicative of a random access transmission resource for communications between the UE and the base station. The operations of 1910 may be performed in accordance with examples as disclosed herein. In some examples, aspects of the operations of 1910 may be performed by an SIB manager 1330 as described with reference to FIG. 13.

At 1915, the method may include receiving, from the UE, a random access channel message over the random access transmission resource, in accordance with the SIB. The operations of 1915 may be performed in accordance with examples as disclosed herein. In some examples, aspects of the operations of 1915 may be performed by a RACH manager 1340 as described with reference to FIG. 13.

The following provides an overview of aspects of the present disclosure:

Aspect 1: A method for wireless communications at a UE, comprising: identifying a cell wake-up signal resource for transmission of a cell wake-up signal; transmitting, to a base station, a cell wake-up signal over the cell wake-up signal resource; and receiving, from the base station and in response to the cell wake-up signal, an SIB that is indicative of a random access transmission resource.

Aspect 2: The method of aspect 1, further comprising: receiving, from the base station, an SSB, wherein the SSB comprises an indication that the base station is not currently transmitting the SIB.

Aspect 3: The method of aspect 2, wherein transmitting the cell wake-up signal is based at least in part on the indication that the base station is not currently transmitting the SIB.

Aspect 4: The method of aspect 3, wherein the indication that the base station is not currently transmitting the SIB comprises at least one of a PBCH, a PSS, or an SSS.

Aspect 5: The method of any of aspects 2 through 4, further comprising: receiving, with the SSB, a PBCH indicating a resource configuration for the cell wake-up signal resource.

Aspect 6: The method of any of aspects 2 through 5, wherein the cell wake-up signal resource is associated with the SSB on a per SSB basis.

Aspect 7: The method of any of aspects 1 through 6, wherein transmitting the cell wake-up signal comprises: transmitting the cell wake-up signal via a physical random access channel sequence.

Aspect 8: The method of any of aspects 1 through 7, wherein receiving the SIB comprises: receiving the SIB over at least one reception occasion of a plurality of reception occasions or during a duration of time.

Aspect 9: The method of any of aspects 1 through 8, wherein receiving the SIB comprises: receiving the SIB over a single reception occasion.

Aspect 10: The method of any of aspects 1 through 9, further comprising: receiving, from the base station, a first SSB comprising a first PBCH indicative of the cell wake-up signal resource, wherein identifying the cell wake-up signal resource is based at least in part on receiving the first PBCH; and receiving, from the base station and in response to transmission of the cell wake-up signal, a second SSB associated with the SIB and comprising a second PBCH indicative of a control resource set configuration.

Aspect 11: The method of any of aspects 1 through 10, further comprising: identifying that the UE has not received an SSB from the base station, wherein transmitting the cell wake-up signal is based at least in part on the identifying that the UE has not received the SSB from the base station.

Aspect 12: The method of aspect 11, further comprising: receiving positioning information for the UE; and identifying the base station based at least in part on the positioning information.

Aspect 13: The method of any of aspects 1 through 12, wherein the SIB comprises an SIB one.

Aspect 14: The method of any of aspects 1 through 13, further comprising: transmitting, to the base station, a random access channel message over the random access transmission resource.

Aspect 15: A method for wireless communications at a base station, comprising: receiving, from a UE, a cell wake-up signal over a cell wake-up signal resource; and transmitting, to the UE and in response to the cell wake-up signal, an SIB that is indicative of a random access transmission resource for communications between the UE and the base station.

Aspect 16: The method of aspect 15, further comprising: transmitting, to the UE, an SSB, wherein the SSB comprises an indication that the base station is not currently transmitting the SIB.

Aspect 17: The method of aspect 16, wherein receiving the cell wake-up signal is based at least in part on the indication that the base station is not currently transmitting the SIB.

Aspect 18: The method of aspect 17, wherein the indication that the base station is not currently transmitting the system information block comprises at least one of a PBCH, a PSS, or an SSS.

Aspect 19: The method of any of aspects 16 through 18, further comprising: transmitting, with the SSB, a PBCH indicating a resource configuration for the cell wake-up signal resource.

Aspect 20: The method of any of aspects 16 through 19, wherein the cell wake-up signal resource is associated with the SSB on a per SSB basis.

Aspect 21: The method of any of aspects 15 through 20, wherein receiving the cell wake-up signal comprises: receiving the cell wake-up signal via a physical random access channel sequence.

Aspect 22: The method of any of aspects 15 through 21, wherein transmitting the SIB comprises: transmitting the SIB over at least one reception occasion of a plurality of reception occasions or during a duration of time.

Aspect 23: The method of any of aspects 15 through 22, wherein transmitting the SIB comprises: transmitting the SIB over a single reception occasion.

Aspect 24: The method of any of aspects 15 through 23, further comprising: transmitting, to the UE, a first SSB comprising a first PBCH indicative of the cell wake-up signal resource, wherein identifying the cell wake-up signal resource is based at least in part on receiving the first PBCH; and transmitting, to the UE and in response to reception of the cell wake-up signal, a second SSB associated with the SIB and comprising a second PBCH indicative of a control resource set configuration.

Aspect 25: The method of any of aspects 15 through 24, wherein the SIB comprises an SIB one.

Aspect 26: The method of any of aspects 15 through 25, further comprising: receiving, from the UE, a random access channel message over the random access transmission resource, in accordance with the SIB.

Aspect 27: An apparatus for wireless communications at a UE, comprising a processor; memory coupled with the processor; and instructions stored in the memory and executable by the processor to cause the apparatus to perform a method of any of aspects 1 through 14.

Aspect 28: An apparatus for wireless communications at a UE, comprising at least one means for performing a method of any of aspects 1 through 14.

Aspect 29: A non-transitory computer-readable medium storing code for wireless communications at a UE, the code comprising instructions executable by a processor to perform a method of any of aspects 1 through 14.

Aspect 30: An apparatus for wireless communications at a base station, comprising a processor; memory coupled with the processor; and instructions stored in the memory and executable by the processor to cause the apparatus to perform a method of any of aspects 15 through 26.

Aspect 31: An apparatus for wireless communications at a base station, comprising at least one means for performing a method of any of aspects 15 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
receiving a synchronization signal block (SSB) comprising an indication that a network device is not periodically transmitting a system information block one (SIB1);
identifying, based at least in part on the indication, a cell wake-up signal resource for transmission of a cell wake-up signal;
transmitting to the network device based at least in part on the indication that the network device is not periodically transmitting the SIB1, the cell wake-up signal over the cell wake-up signal resource; and
receiving, from the network device and in response to the cell wake-up signal, the SIB1.

2. The method of claim 1, wherein the indication that the network device is not periodically transmitting the SIB1 comprises at least one of a physical broadcast channel of the SSB, a primary synchronization signal of the SSB, or a secondary synchronization signal of the SSB.

3. The method of claim 2, wherein the indication that the network device is not periodically transmitting the SIB1 comprises a first type of demodulation reference signal sequence being included within the physical broadcast channel off the SSB, wherein a second type of demodulation reference signal sequence being included within the physical broadcast channel off the SSB is associated with indication that the network device is periodically transmitting the SIB1.

4. The method of claim 2, wherein the indication that the network device is not periodically transmitting the SIB1 comprises a first sequence type being used for the primary synchronization signal of the SSB or the secondary synchronization signal of the SSB, wherein a second sequence type being used for the primary synchronization signal of the SSB or the secondary synchronization signal of the SSB is associated with indication that the network device is periodically transmitting the SIB1.

5. The method of claim 1, further comprising:
receiving, with the SSB, a physical broadcast channel indicating a resource configuration for the cell wake-up signal resource.

6. The method of claim 1, wherein cell wake-up signal resources are associated with respective SSBs on a per SSB basis for a plurality of SSBs, wherein each SSB of the plurality of SSBs is associated with a respective beam, wherein the plurality of SSBs includes the SSB, and wherein the cell wake-up signal resources include the cell wake-up signal resource.

7. The method of claim 1, wherein transmitting the cell wake-up signal comprises:
transmitting the cell wake-up signal via a physical random access channel sequence.

8. The method of claim 1, wherein receiving the SIB1 comprises:
receiving the SIB1 over at least one reception occasion of a plurality of reception occasions or during a duration of time.

9. The method of claim 1, wherein receiving the SIB1 comprises:
receiving the SIB1 over a single reception occasion.

10. The method of claim 1, further comprising:
receiving, from the network device, the SSB comprising a first physical broadcast channel indicative of the cell wake-up signal resource, wherein identifying the cell wake-up signal resource is based at least in part on receiving the first physical broadcast channel; and
receiving, from the network device and in response to transmission of the cell wake-up signal, a second SSB associated with the SIB1 and comprising a second physical broadcast channel indicative of a control resource set configuration.

11. The method of claim 1, further comprising:
transmitting, to the network device, a random access channel message over a random access transmission resource indicated by the SIB1.

12. The method of claim 11, wherein the random access channel message is a message one (Msg1) of multi-step random access channel procedure.

13. A method for wireless communications at a network device, comprising:
transmitting, to a user equipment (UE), a synchronization signal block (SSB) comprising an indication that the network device is not periodically transmitting a system information block one (SIB1);
receiving a cell wake-up signal over a cell wake-up signal resource from the UE based at least in part on the indication that the network device is not periodically transmitting the SIB1; and
transmitting, to the UE and in response to the cell wake-up signal, the SIB1.

14. The method of claim 13, wherein the indication that the network device is not periodically transmitting the SIB1 comprises at least one of a physical broadcast channel off the SSB, a primary synchronization signal off the SSB, or a secondary synchronization signal off the SSB.

15. The method of claim 14, wherein the indication that the network device is not periodically transmitting the SIB1 comprises a first type of demodulation reference signal sequence being included within the physical broadcast channel off the SSB, wherein a second type of demodulation reference signal sequence being included within the physical broadcast channel off the SSB is associated with indication that the network device is periodically transmitting the SIB1.

16. The method of claim 14, wherein the indication that the network device is not periodically transmitting the SIB1 comprises a first sequence type being used for the primary synchronization signal of the SSB or the secondary synchronization signal of the SSB, wherein a second sequence type being used for the primary synchronization signal of the SSB or the secondary synchronization signal of the SSB is associated with indication that the network device is periodically transmitting the SIB1.

17. The method of claim 13, further comprising:
transmitting, with the SSB, a physical broadcast channel indicating a resource configuration for the cell wake-up signal resource.

18. The method of claim 13, wherein cell wake-up signal resources are associated with respective SSBs on a per SSB basis for a plurality of SSBs, wherein each SSB of the plurality of SSBs is associated with a respective beam, wherein the plurality of SSBs includes the SSB, and wherein the cell wake-up signal resources include the cell wake-up signal resource.

19. The method of claim 13, wherein receiving the cell wake-up signal comprises:
receiving the cell wake-up signal via a physical random access channel sequence.

20. The method of claim 13, wherein transmitting the SIB1 comprises:

transmitting the SIB1 over at least one reception occasion of a plurality of reception occasions or during a duration of time.

21. The method of claim 13, wherein transmitting the SIB1 comprises:
transmitting the SIB1 over a single reception occasion.

22. The method of claim 13, further comprising:
transmitting, to the UE, the SSB comprising a first physical broadcast channel indicative of the cell wake-up signal resource, wherein the cell wake-up signal resource is based at least in part on the first physical broadcast channel; and
transmitting, to the UE and in response to reception of the cell wake-up signal, a second SSB associated with the SIB1 and comprising a second physical broadcast channel indicative of a control resource set configuration.

23. The method of claim 13, further comprising:
receiving, from the UE, a random access channel message over a random access transmission resource indicated by the SIB1.

24. A user equipment (UE), comprising:
at least one processor;
memory coupled with the at least one processor; and
instructions stored in the memory and executable by the at least one processor to cause the UE to:
receive a synchronization signal block (SSB) comprising an indication that a network device is not periodically transmitting a system information block one (SIB1);
identify, based at least in part on the indication, a cell wake-up signal resource for transmission of a cell wake-up signal;
transmit to the network device based at least in part on the indication that the network device is not periodically transmitting the SIB1, the cell wake-up signal over the cell wake-up signal resource; and
receive, from the network device and in response to the cell wake-up signal, the SIB1.

25. The UE of claim 24, wherein the indication that the network device is not periodically transmitting the SIB1 comprises at least one of a physical broadcast channel, a primary synchronization signal, or a secondary synchronization signal.

26. The UE of claim 25, wherein the indication that the network device is not periodically transmitting the SIB1 comprises a first type of demodulation reference signal sequence being included within the physical broadcast channel off the SSB, wherein a second type of demodulation reference signal sequence being included within the physical broadcast channel off the SSB is associated with indication that the network device is periodically transmitting the SIB1.

27. The UE of claim 25, wherein the indication that the network device is not periodically transmitting the SIB1 comprises a first sequence type being used for the primary synchronization signal of the SSB or the secondary synchronization signal of the SSB, wherein a second sequence type being used for the primary synchronization signal of the SSB or the secondary synchronization signal of the SSB is associated with indication that the network device is periodically transmitting the SIB1.

28. The UE of claim 24, wherein the instructions are further executable by the at least one processor to cause the UE to:
transmit, to the network device, a random access channel message over a random access transmission resource indicated by the SIB1.

29. The UE of claim 24, wherein the instructions are further executable by the at least one processor to cause the UE to:
receive a physical broadcast channel indicating a resource configuration for the cell wake-up signal resource.

30. A network device, comprising:
at least one processor;
memory coupled with the at least one processor; and
instructions stored in the memory and executable by the at least one processor to cause the network device to:
transmit, to a user equipment (UE), a synchronization signal block (SSB) comprising an indication that the network device is not periodically transmitting a system information block one (SIB1);
receive a cell wake-up signal over a cell wake-up signal resource from the UE based at least in part on the indication that the network device is not periodically transmitting the SIB1; and
transmit, to the UE and in response to the cell wake-up signal, the SIB1.

* * * * *